(12) United States Patent
Crookham et al.

(10) Patent No.: US 8,971,566 B2
(45) Date of Patent: *Mar. 3, 2015

(54) MARKETING CAMPAIGN PLATFORM

(71) Applicant: Spyder Lynk LLC, Denver, CO (US)

(72) Inventors: David M. Crookham, Valentia, CA (US); Nicole Skogg, Aurora, CO (US)

(73) Assignee: Spyder Lynk LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/833,688

(22) Filed: Mar. 15, 2013

(65) Prior Publication Data

US 2013/0272567 A1   Oct. 17, 2013

Related U.S. Application Data

(63) Continuation of application No. 13/276,540, filed on Oct. 19, 2011, now Pat. No. 8,462,986.

(51) Int. Cl.
| | |
|---|---|
| *G06K 9/00* | (2006.01) |
| *G06K 9/20* | (2006.01) |
| *G06K 9/46* | (2006.01) |
| *G06K 19/06* | (2006.01) |
| *G06F 17/30* | (2006.01) |

(52) U.S. Cl.
CPC ............... *G06K 9/00* (2013.01); *G06K 9/2063* (2013.01); *G06K 9/4671* (2013.01); *G06K 19/06009* (2013.01)
USPC ........................... 382/100; 382/239; 707/770

(58) Field of Classification Search
USPC ......... 382/100, 103, 106–107, 155, 162, 168, 382/173, 181, 189, 209, 232, 254, 274, 276, 382/286–291, 305, 312, 224, 239; 725/32; 709/250; 705/14.4; 707/770
See application file for complete search history.

(56) References Cited

U.S. PATENT DOCUMENTS

| | | |
|---|---|---|
| 2,612,994 A | 10/1952 | Woodland et al. |
| 4,204,639 A | 5/1980 | Barber et al. |
| 4,581,482 A | 4/1986 | Rothfjell |
| 5,128,525 A | 7/1992 | Stearns et al. |
| 5,168,147 A | 12/1992 | Bloomberg |

(Continued)

FOREIGN PATENT DOCUMENTS

| | | |
|---|---|---|
| EP | 1054335 A2 | 11/2000 |
| JP | 2001273441 | 10/2001 |

(Continued)

OTHER PUBLICATIONS

Winnik, Arthur, "Canadian Office Action re Application No. 2,640,153", May 6, 2014, p. 2 Published in: CA.

(Continued)

*Primary Examiner* — Seyed Azarian
(74) *Attorney, Agent, or Firm* — Neugeboren O'Dowd PC

(57) ABSTRACT

A method of linking an encoded image with a campaign database, comprises providing an image to a user, the image being associated with at least a portion of a value, referencing the at least a portion of the value to a campaign database that includes a collection of data, providing, through the campaign database, a plurality of responses, at least one of the responses based on a characteristic of the encoded image, and delivering, to the user, one or more specific responses selected from the plurality of responses.

21 Claims, 20 Drawing Sheets

(56) References Cited

U.S. PATENT DOCUMENTS

| | | | |
|---|---|---|---|
| 5,369,261 A | 11/1994 | Shamir | |
| 5,395,181 A | 3/1995 | Dezse et al. | |
| 5,467,155 A | 11/1995 | Miyazaki et al. | |
| 5,675,671 A | 10/1997 | Hayduchok et al. | |
| 5,761,686 A | 6/1998 | Bloomberg | |
| 5,841,978 A | 11/1998 | Rhoads | |
| 5,933,829 A | 8/1999 | Durst et al. | |
| 5,978,773 A | 11/1999 | Hudetz et al. | |
| 6,076,738 A | 6/2000 | Bloomberg et al. | |
| 6,108,656 A | 8/2000 | Durst et al. | |
| 6,122,403 A | 9/2000 | Rhoads | |
| 6,314,457 B1 | 11/2001 | Schena et al. | |
| 6,324,573 B1 | 11/2001 | Rhoads | |
| 6,434,561 B1 | 8/2002 | Durst, Jr. et al. | |
| 6,446,871 B1 | 9/2002 | Buckley et al. | |
| 6,542,933 B1 | 4/2003 | Durst, Jr. et al. | |
| 6,549,894 B1 | 4/2003 | Simpson et al. | |
| 6,614,914 B1 | 9/2003 | Rhoads et al. | |
| 6,647,130 B2 | 11/2003 | Rhoads | |
| 6,650,761 B1 | 11/2003 | Rodriguez et al. | |
| 6,661,904 B1 | 12/2003 | Sasich et al. | |
| 6,742,708 B2 | 6/2004 | Shaked et al. | |
| 6,813,367 B1 | 11/2004 | Bhattacharjya | |
| 6,819,776 B2 | 11/2004 | Chang | |
| 6,826,289 B1 | 11/2004 | Hashimoto | |
| 6,865,608 B2 | 3/2005 | Hunter | |
| 6,892,947 B1 | 5/2005 | Jam et al. | |
| 6,938,017 B2 | 8/2005 | Yen et al. | |
| 6,947,571 B1 * | 9/2005 | Rhoads et al. | 382/100 |
| 6,965,682 B1 | 11/2005 | Davis et al. | |
| 6,965,683 B2 | 11/2005 | Hein, III | |
| 6,980,654 B2 | 12/2005 | Alasia et al. | |
| 6,993,573 B2 | 1/2006 | Hunter | |
| 7,226,087 B2 | 6/2007 | Alasia et al. | |
| 7,383,209 B2 | 6/2008 | Hudetz et al. | |
| 7,430,588 B2 | 9/2008 | Hunter | |
| 7,520,001 B2 | 4/2009 | Gotoh et al. | |
| 6,199,048 C1 | 6/2009 | Hudets et al. | |
| 7,680,324 B2 | 3/2010 | Boncyk et al. | |
| 7,697,945 B2 | 4/2010 | Franklin | |
| 7,751,629 B2 | 7/2010 | Cheong et al. | |
| 7,765,126 B2 | 7/2010 | Hudetz et al. | |
| 7,844,492 B2 * | 11/2010 | Perkowski et al. | 705/14.4 |
| 7,865,623 B2 * | 1/2011 | Mayle et al. | 709/250 |
| 8,005,720 B2 | 8/2011 | King et al. | |
| 8,094,870 B2 | 1/2012 | Crookham et al. | |
| 8,095,555 B2 | 1/2012 | Ishikawa et al. | |
| 8,126,643 B2 | 2/2012 | Eronen et al. | |
| 8,131,597 B2 | 3/2012 | Hudetz et al. | |
| 8,156,128 B2 | 4/2012 | Doughty et al. | |
| 8,194,914 B1 | 6/2012 | Crookham et al. | |
| 8,194,986 B2 * | 6/2012 | Conwell | 382/224 |
| 8,238,885 B2 | 8/2012 | Mueller et al. | |
| 8,483,484 B2 * | 7/2013 | Boncyk et al. | 382/181 |
| 2001/0001854 A1 | 5/2001 | Schena et al. | |
| 2001/0023457 A1 | 9/2001 | Tack-Don et al. | |
| 2002/0020746 A1 | 2/2002 | Roustaei | |
| 2002/0028015 A1 | 3/2002 | Tack-don et al. | |
| 2002/0032698 A1 | 3/2002 | Cox | |
| 2002/0037097 A1 | 3/2002 | Hoyos et al. | |
| 2002/0062382 A1 | 5/2002 | Rhoads et al. | |
| 2002/0067855 A1 | 6/2002 | Chiu et al. | |
| 2002/0075298 A1 | 6/2002 | Schena et al. | |
| 2002/0186884 A1 | 12/2002 | Shaked et al. | |
| 2002/0194480 A1 | 12/2002 | Nagao | |
| 2003/0040957 A1 | 2/2003 | Rodriguez et al. | |
| 2004/0026510 A1 | 2/2004 | Cheung et al. | |
| 2004/0044576 A1 | 3/2004 | Kurihara et al. | |
| 2004/0062443 A1 | 4/2004 | Yen et al. | |
| 2004/0078333 A1 | 4/2004 | Hilton et al. | |
| 2004/0117627 A1 | 6/2004 | Brewington | |
| 2004/0123134 A1 | 6/2004 | Sasich et al. | |
| 2004/0125413 A1 | 7/2004 | Cordery | |
| 2004/0249709 A1 | 12/2004 | Donovan et al. | |
| 2004/0258274 A1 | 12/2004 | Brundage et al. | |
| 2005/0084158 A1 | 4/2005 | Yano | |
| 2005/0109846 A1 | 5/2005 | Lubow | |
| 2005/0179956 A1 | 8/2005 | Silverbrooks et al. | |
| 2006/0097062 A1 | 5/2006 | Cheong et al. | |
| 2006/0098241 A1 | 5/2006 | Cheong et al. | |
| 2006/0255163 A1 | 11/2006 | Bian | |
| 2006/0267753 A1 | 11/2006 | Hussey et al. | |
| 2007/0088953 A1 | 4/2007 | Hilton et al. | |
| 2007/0119944 A1 | 5/2007 | Cai | |
| 2007/0189579 A1 * | 8/2007 | Crookham et al. | 382/100 |
| 2008/0002853 A1 | 1/2008 | Kawabe et al. | |
| 2009/0158318 A1 * | 6/2009 | Levy | 725/32 |
| 2009/0255992 A1 | 10/2009 | Shen | |

FOREIGN PATENT DOCUMENTS

| | | |
|---|---|---|
| JP | 2002163532 | 6/2002 |
| JP | 2003044414 | 2/2003 |
| JP | 2003150437 | 5/2003 |
| JP | 2005286844 | 10/2005 |

OTHER PUBLICATIONS

Winnik, Arthur, "Canadian Office Action re Application No. 2,640,153", Aug. 27, 2013, p. 2, Published in: CA.

Smith, Dallas F., "Response to Canadian Office Action re Application No. 2,640,153", Dec. 11, 2013, p. 4, Published in: CA.

Morris, J., "CueCat Resources", "Webpage at http://www.beau.lib.la.us/~jmorris/linux/cuecat/ downloaded", Sep. 7, 2005, p. 4, Published in: US.

Heusler, Nikolaus, "EPO Communication re Application No. 07 762 657.0-2110", Oct. 26, 2010, p. 7, Published in: EP.

Heusler, Nikolaus, "EPO Communication re Application No. 07 762 657.0-2210", Feb. 1, 2013, p. 4, Published in: EP.

Heusler, N., "Communication from EPO related to Application No. 07 762 657.0-2210", Jun. 6, 2011, p. 4 Published in: EP.

Heusler, Nikolaus, "EPO Communication re Application No. 07 762 657.0", Jul. 9, 2012, p. 3, Published in: EP.

Heusler, Nikolaus, "Communication from EPO re Application No. 07 762 657.0-2210", Dec. 27, 2011, p. 5, Published in: EP.

Belia, Matthew, "Written Opinion of the International Searching Authority re Application PCT/US07/02451", Sep. 24, 2008, p. 4 Published in: PCT.

Heusler, N., "International Search Report re Application No. PCT/US07/002451", Oct. 26, 2010, p. 7, Published in: EP.

"Pumps & Boots Trend Book", "Merchandise Catalog", 2006, p. 2.

Percival, Shane, "Response to EPO Office Action re Application No. 07 762 657.0-2210", Mar. 27, 2013, p. 6, Published in: US.

* cited by examiner

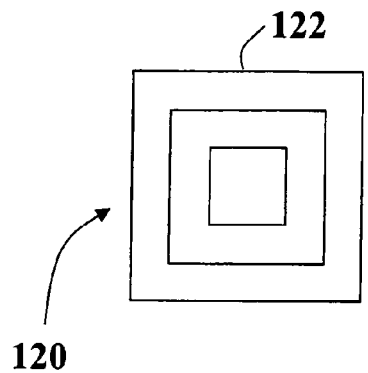
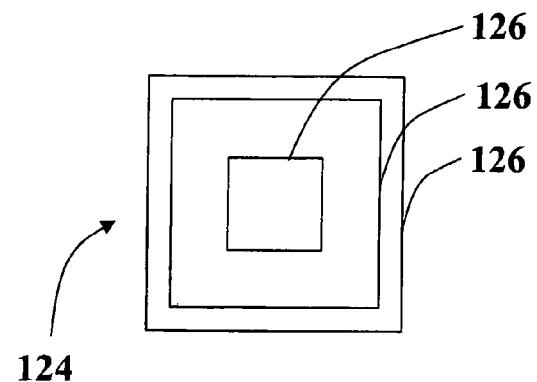
FIG. 13A                FIG. 13B
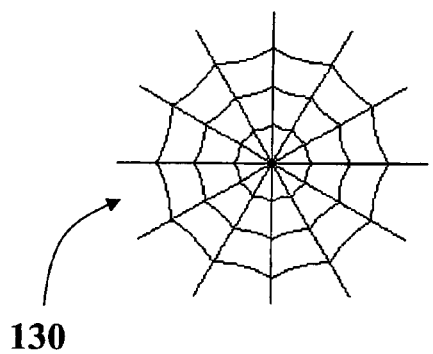
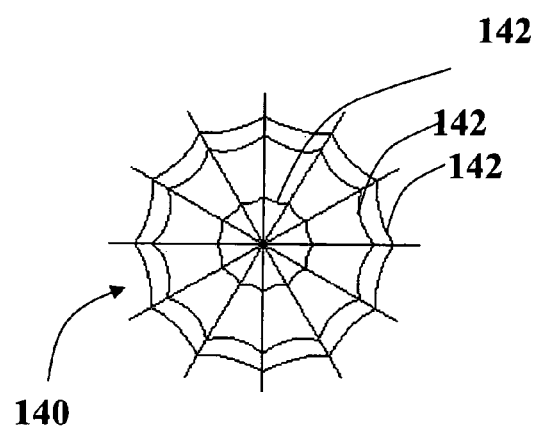
FIG. 13C                FIG. 13D
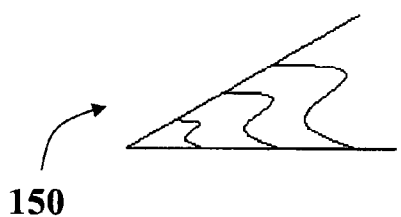
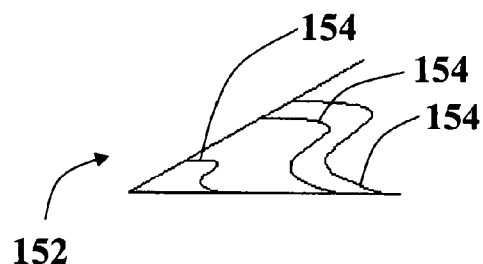
FIG. 13E                FIG. 13F

| Numeric Value | Company | Product | Promotion | Print Medium | Vendor | Date of Publication | Lynk Expiration | URL | Action | Notes |
|---|---|---|---|---|---|---|---|---|---|---|
| 8759438 | Fendi | New Boots | new product | Magazine Ad | Allure | October '05 | none | www.fendi.com/newboots | create "my lynks" | link to new product information |
| 1523648 | Sketchers | New sneakers | new product | Magazine Ad | Vogue | 9.25.05 | none | www.sketchers.com/newsneakers | create "my lynks" | link to new product information |
| 5213542 | Sketchers | N/A | Vacation Sweepstakes | Product packaging | N/A | 10.15.05 | 10.31.05 | www.sketchers.com | enter customer in sweepstakes / create "my lynks" | sweepstakes entry for user |
| 1532154 | Memorex | Recordable CD's | sustained product | Poster | Staples | 8.23.05 | none | www.memorex.com/blankcds | create "my lynks" / coupon for user | one coupon per user |
| 3125468 | Memorex | Recordable CD's | sustained product | Poster | Office Depot | 8.23.05 | none | www.memorex.com/blankcds | create "my lynks" / coupon for user | one coupon per user |

| Numeric Value | Company | Product | Promotion | Print Medium | Vendor | Date of Publication | Hits | Total Weeks | Hits by week | | | | | | |
|---|---|---|---|---|---|---|---|---|---|---|---|---|---|---|---|
| 8759438 | Fendi | Chameleon Boots | new product | Magazine Ad 8769 | Allure | October '05 | 15,229 | 8 | 890 | 786 | 6786 | 6785 | 248 | 24 | 10 | 0 |
| 1523648 | Sketchers | New sneakers | new product | Magazine Ad 6785 | Vogue | 9.25.05 | 225,244 | 6 | 87678 | 6785 | 67876 | 57876 | 56576 | 6565 | 764 | |
| 5213542 | Sketchers | N/A | Vacation Sweepstakes | Product packaging | N/A | 10.15.05 | 905,576 | 2 | 28796 | 876780 | | | | | | |
| 1532154 | Memorex | Recordable CD's | sustained product | Poster | Staples | 11.15.05 | 0 | 0 | | | | | | | | |
| 3125468 | Memorex | Recordable CD's | sustained product | Poster | Office Depot | 11.15.05 | 0 | 0 | | | | | | | | |

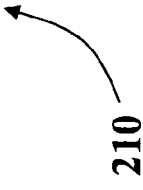

MARKETING CAMPAIGN PLATFORM

PRIORITY AND RELATED APPLICATIONS

This application is a continuation of and claims priority to U.S. patent application Ser. No. 13/276,540 filed Oct. 19, 2011, which claims priority to U.S. patent application Ser. No. 11/627,967 filed Jan. 27, 2007, now U.S. Pat. No. 8,094,870, which claims priority to U.S. Provisional Application No. 60/762,914 entitled "Encoding and Decoding Data in an Image," filed Jan. 27, 2006, and to U.S. Provisional Application No. 60/763,026 entitled "Images and Methods for Product or Service Marketing" filed on Jan. 27, 2006, the disclosures of which are hereby incorporated by reference in their entirety.

FIELD

This invention relates, in general, to images encoded with data.

BACKGROUND

One and two dimensional bar codes have been developed as machine readable representations of information primarily for use in packaging, price tags and inventory control. However, the components of the bar code elements, either in part or in whole, restrict the creative graphical design of the bar code. For example, two dimensional bar codes generally store information along the height as well as the length of a symbol as a series of black and white squares within a grid. Accordingly, variation within the grid is limited to rearrangement of the black and white squares.

As recognized by the present inventors, what is needed is a graphically based image or icon that can serve as a link from physical material or visual displays to electronic data. It is against this background that the various embodiments of the present invention were developed.

SUMMARY

According to one broad aspect of one embodiment of the present invention, disclosed herein is a method for encoding an image with data. The encoded image may be used for a variety of purposes, including for marketing, social network, or other purposes as disclosed herein. In one embodiment, the method of encoding uses a primary image and a secondary image, the secondary image selectively oriented or positioned in relation to the primary image based on the numeric value or a portion of the numeric value.

In one example, a primary image may be a graphic such as a logo having a set of coordinates that originate from a pre-defined origin, where the coordinates further define a 0° axis. A secondary image may be selectively oriented in relation to the primary image. A numeric value may be determined from the position of the secondary image in relation to the coordinates of the primary image.

In another embodiment, an encoded image encoded with a value comprises a first image that defines an origin and one or more shapes selectively positioned in reference to the origin. The position of the one or more shapes in relation to the origin defines the value.

In another embodiment, a value comprising digits or alphanumeric characters is encoded into an image. In this method, a reference graph is formed by positioning a series of concentric shapes in reference to an origin according to the number of digits or characters in the value to be encoded. The position of the shapes in the reference graph is used to form an encoded image using the value to be encoded.

In another embodiment, an encoded image can be decoded to extract a value by using the encoded image to identify reference graph, comparing the reference graph to the encoded image, and extracting the value from the encoded image based on the comparison with the reference graph. The value extracted from the image can be then used, in conjunction with a lookup table, to retrieve additional information linked to the value. In this way, the encoded image can be used to direct a user who captures the encoded image on a device such as a camera cell phone, to other information or websites.

In one embodiment, the encoded image may be used as a link to retrieve data. In this embodiment, the encoded image may be affixed to a medium, digitized and wirelessly transmitted to a designated website. The digitized image is processed to decode the image and extract an encoded value. This value is used to identify the associated information, for example, by referencing a look up table.

Embodiments of this invention may be used to establish electronic connections between a consumer with a mobile camera phone and a merchant through the use of encoded images disclosed herein. A merchant or company interested in promoting its products or services may create a wireless connection or link between its print advertising or other promotional mediums to additional information that can be instantly displayed on the user's cell phone. Digital images and the ability to decode an encoded image in a real time basis can allow a merchant to enhance its advertising or promotional investment by creating a nearly instantaneous link between the physical world of print mediums and the electronic world via a mobile camera phone.

Conversely, embodiments of the invention may be used to establish an electronic communication between an individual possessing an encoded image (in either electronic or physical form, such as a personal identification encoded image on a medium such as a ID card) and a merchant or company who establishes a link to itself via an input device such as a digital camera connected to a communication network as apart of a promotion or offer. In this embodiment, the encoded image is in the possession of the consumer and the input device is provided by the merchant or company seeking consumer participation in a product or service promotion or offer.

Embodiments of the present invention may also be used to promote social networking, wherein individuals can use encoded images to convey personal information to other individuals.

The features, utilities and advantages of the various embodiments of the invention will be apparent from the following more particular description of embodiments of the invention as illustrated in the accompanying drawings.

BRIEF DESCRIPTION OF DRAWINGS

FIG. 13A is an example of a reference graph having concentric squares according to one embodiment of the invention.

FIG. 13B is an example of an encoded image based on the reference graph of FIG. 13A according to one embodiment of the invention.

FIG. 13C is an example of a reference graph having concentric polygons according to one embodiment of the invention.

FIG. 13D is an example of an encoded image based on the reference graph of FIG. 13C according to one embodiment of the invention.

FIG. 13E is an example of a reference graph having non-linear lines positioned in reference to the origin according to one embodiment of the invention.

FIG. 13F is an example of an encoded image based on the reference graph of FIG. 13E according to one embodiment of the invention.

FIG. 18 is an example of data lookup table according to one embodiment of the invention.

FIG. 19 is an example of a tracking table according to one embodiment of the invention.

DETAILED DESCRIPTION

Figure 1:
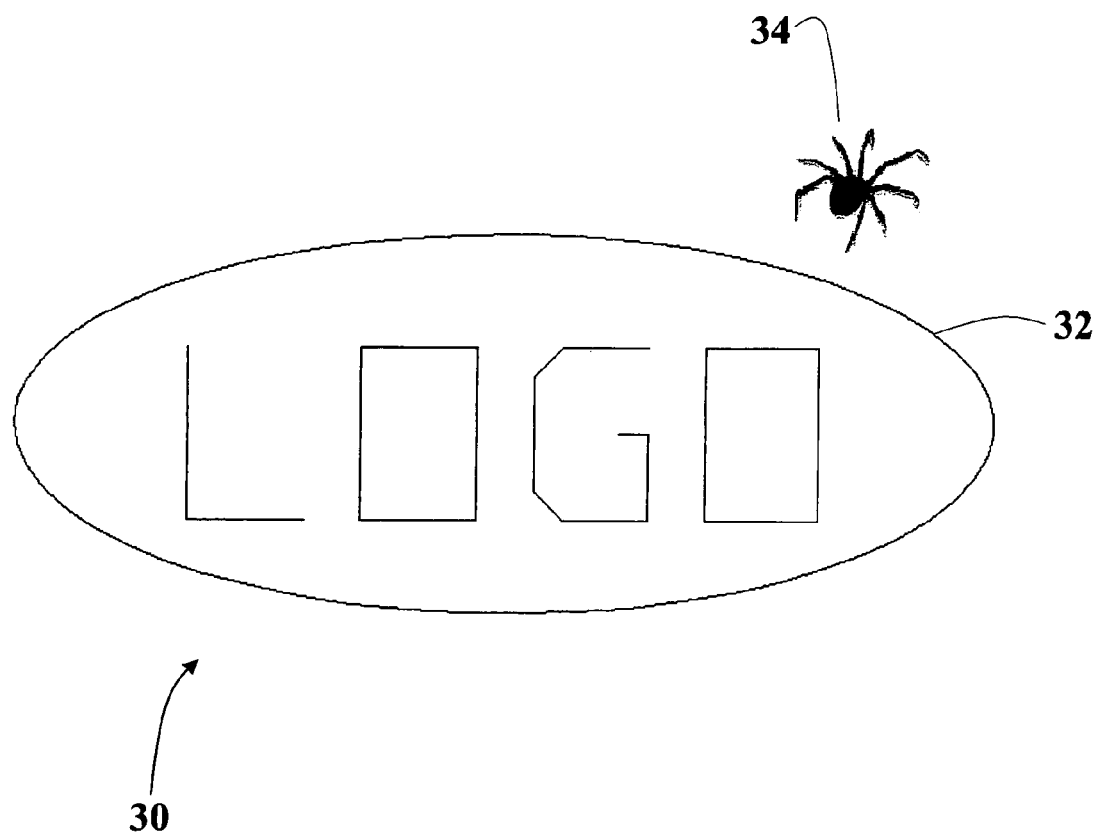
FIG. 1 is an example of an encoded image according to one embodiment of the invention.

Disclosed herein are various embodiments of encoded images, methods for encoding data into an image to form an encoded image, methods for decoding an encoded image to extract data therefrom, and methods to use encoded images for a variety of uses.

As described herein, an image may be encoded with data to form an encoded image or encoded symbol, and the encoded image may be incorporated into a print advertising or other medium that can be digitized or captured with a mobile camera phone or other electronic device. The captured encoded image may be communicated through wireless communication protocols, decoded, and linked to a database containing information associated with the encoded image. In this way, an encoded image can be used by a company in a print advertisement or other media, and the company can link the encoded image to other information (such as web site pages). When a user/customer/consumer captures the encoded image in the user's mobile device (such as a cell phone with a digital camera), the encoded image can be used to automatically direct the user's cell phone to the additional information set up by the company (i.e., the user's cell phone could be automatically loaded with or directed to photos, data, web pages or other information from the company). For instance, consumers could obtain (for customers on their mobile phone) more information or initiate transactions that are linked to the encoded image.

As described herein, an encoded image can be encoded to contain a unique value, such as a numeric value, so that a plurality of unique encoded images can be formed, each encoded with a different and unique value. Thus, a unique graphical encoded image may be associated with—for example, a particular advertisement, web site, marketing program, corporate promotion, product promotion, sweepstakes, etc.—and when the encoded image is decoded, the unique data or value is extracted from the encoded image and can be processed for whatever purpose the encoded image is being used. In this manner, encoded images can be formed that have a similar overall appearance although each image actually contains unique encoded data. In one embodiment, a method is provided to utilize a reference image database and digital image analysis to locate, map and measure encoded images to decode the data set embedded therein.

For example, the encoded image may be electronically linked or referenced to a mobile marketing campaign database to provide a user with instant retrieval of specifics related to an advertising campaign or other promotional program. The campaign database may further be accessible by companies or advertisers to manage marketing campaigns.

Encoded images could also be used by individuals to create and facilitate business and social networking, communications and relationships through their encoded image. A person could create or obtain an encoded image, and that person could link the encoded image to other information (such as personal web site pages). When the person and a second person are meeting or socializing, the second person could capture the encoded image in the second person's mobile device (such as a cell phone with a digital camera), and the encoded image can be used to automatically direct the second person's cell phone to the additional information set up by the first person the second person's cell phone could be automatically loaded with or directed to personal information, photos, data, web pages or other information from the first person).

Embodiments of the invention may be used to create various and numerous unique encoded images with numeric values or codes. With the unaided eye, the encoded images can appear very similar and may appear virtually indistinguishable one from another. When an encoded image is digitized by person's digital camera (i.e., in a cell phone) and processed, a unique code or value stored in the encoded image is determined.

An encoded image can symbolize a link to the Internet/web and can be used to communicate to a customer that the image is in fact encoded and can be captured through the use of a mobile digital camera device or the like and sent wirelessly to a web site or other location for decoding, analysis and follow-on response from an advertiser or other party.

In one embodiment, the encoded image can be used on a printed medium such as a product brochure, product label, printed advertisement, a tag, and on other items or with other uses as disclosed herein. An encoded image can be implemented as a small mark that can create a unique identity for a print medium with minimal disruption of the advertiser's message. This is in contrast with conventional encoding methods such as linear and 2-D bar coding which can be perceived by customers as a utilitarian coding mechanism.

Examples of Encoded Images

FIGS. 1-2, 3, 15 and others illustrate various examples of encoded images, in accordance with some embodiments of the present invention.

Figure 2:
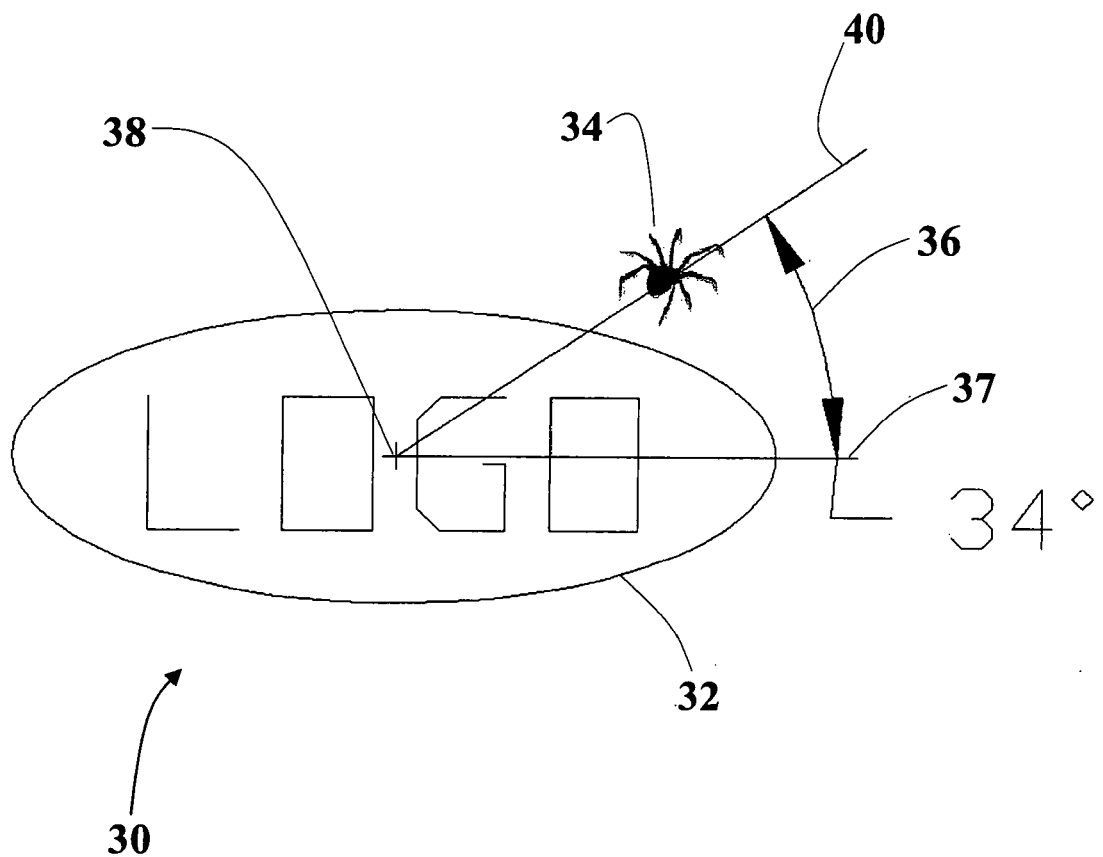
FIG. 2 is an example of the reference coordinates of the encoded image as shown in FIG. 1.

In FIGS. 1-2, an encoded image 30 has a primary image 32 (also referred to herein as an anchor image) and one or more secondary images 34. In one example, the position of the secondary image 34 relative to the primary image 32 can be used to encode data in the encoded image 30. The primary image 32 could take many different forms, such as but not limited to a logo, symbol, identifiable image, photo, person's initials, trademark, corporate symbol, product image, or the like. The secondary image 34 could also take many different forms, for instance the secondary image 34 could be an image that is thematically or creatively related to the primary image, if desired.

If desired, in FIG. 1, the color, size, shape, rotation or other characteristic of the primary image 32 or secondary image 34 may also be used to encode data.

The primary image 32 may include an identifiable mark, an identity image, or anchor image. The primary image may be used as an index into an image database containing numerous different identifiable marks.

In some embodiments, the secondary image 34 may be an image that conveys to the consumer that the encoded image on the print medium can be electronically linked via a mobile camera phone or similar wireless image capturing device, to the internet or other wireless communication network such as the cellular phone network. The secondary image may be used during decoding to reference the encoded image to a reference image. The secondary image can be an already recognizable symbol such as a logo or product image or other image, if desired, or it can be a uniquely encoded image as well.

The encoded image 30 is captured/digitized and sent to a specific destination (i.e., computer capable of decoding the image). The primary image 32 may be compared to the images stored in a reference image database, and if a match is determined, then one or more actionable operations may be initiated. For instance, the primary image may be associated with a particular web site associated with a company, advertiser, or individual.

The position, size, orientation, type or color of secondary image(s) 34 relative to the primary image 32 may also be used to decode the encoded image 30. For instance, the angle 36 at which the secondary image 34 is positioned relative to the primary image may be used to encode data. If multiple secondary images are used, the angle at which the secondary images are positioned relative to the primary image may be used to encode sets of data, for instance, portions of a value that when concatenated after decoding, can be used to reconstruct the data value encoded in the encoded image 30.

For example, a product logo, brand name, graphic design or any other image can be used as the primary/anchor image 32 which can be used during the decoding to identify a reference graph to decode the encoded image 30. The secondary image(s) 34 may also be encoded, if desired, for instance through numerous inherent variables and/or variables relative to the anchor image 32.

In this example, the "LOGO" text and surrounding ellipse (the ellipse is optional and provided only as an example) are an example of an anchor image or primary image 32 and can be used to specify the reference graph during decoding. In this example, one secondary image 34 is shown; however, multiple secondary images could be used. During decoding the primary anchor image 32 of the encoded image 30 could be compared to images stored in an anchor image or reference image database.

Referring to FIG. 2, in this example, polar coordinates or angular values can be used during encoding to encode a value into the encoded image by positioning the secondary image 34 relative to the anchor/primary image 32. The polar location and/or various characteristics of the secondary image can be used to encode data in the encoded image. The polar location, in this instance, is defined by the angle theta 36 formed by the positioning of the secondary image in reference to the 0° axis 37 defined along the horizontal center 38 of the anchor/primary image 32. In one example, the angle 36 defines a numeric value that can be used in a data look up table.

Referring still to FIG. 2, in this example, theta is equal to 34 degrees, which may define all or part of the numeric value encoded in the encoded image 30. A ray 40 can be drawn to extend from the origin 38 of the anchor/primary image 32 defined by a predefined point that may be located at the centroid of the primary image to the midpoint of the secondary image 34 (or to a predefined origin and/or centroid of the secondary image). The ray 40 connecting these points can be used to define the theta angle with respect to the 0° axis 37.

In addition to the variable of theta, various other elements of the secondary image may be used in conjunction with or as alternatives to the angle theta as variables to enable the encoding of more digits within an encoded image. Examples of these characteristics of the secondary image 34 can be relative size, theta location, distance from the anchor/primary image origin, and/or rotation about its own origin relative to the rotation of the primary image. In addition, numerous variables inherent in the secondary image can be used to encode numeric values such as missing and/or added parts of the image, and various colored parts.

Figure 3:
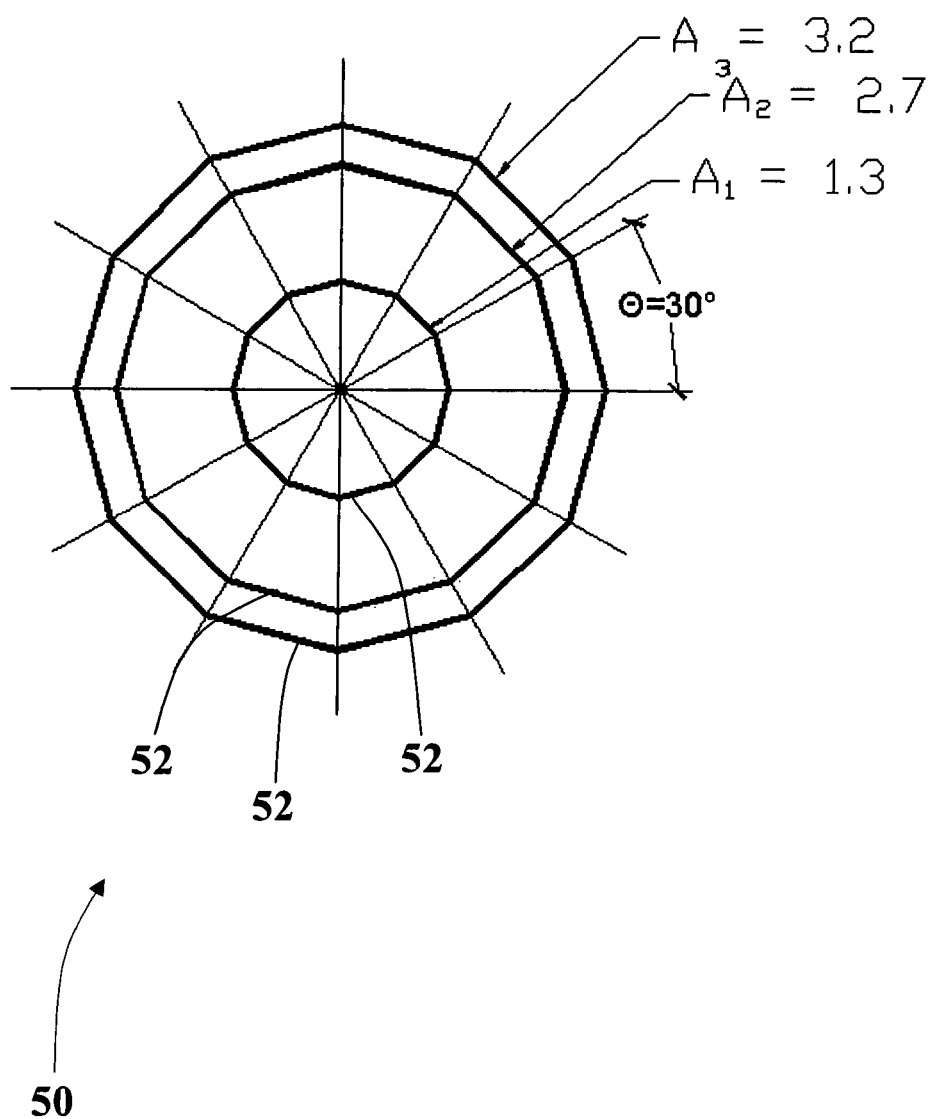
FIG. 3 is an example of an encoded image according to one embodiment of the invention.

FIG. 3 illustrates another example of an encoded image 50 in accordance with an embodiment of the present invention. In FIG. 3, an encoded image 50 includes a set of concentric shapes 52, wherein the position of the concentric shapes contains the data value encoded in the encoded image. An encoded image 50 can be incorporated into many different images, such as (by way of example only) a spider web, sea shells, and any other shape or form, such as concentric shapes or partially concentric shapes. The concentric or partially concentric shapes 52 may be similar in form, but can also vary in form. In one embodiment, an encoded image can be in the form of any printed shape, figure, logo, or other form.

In this example of FIG. 3, an encoded image 50 may be formed in relation to a reference graph or reference image 54 (these terms are used interchangeably herein). The reference graph 54 serves as a base image that may be used to form an encoded image 50. The reference graph 54 may further be used to decode the encoded image 50 and extract the data encoded therein. In one example, during decoding, the encoded image 50 is compared against a corresponding reference graph 54 to extract data from the encoded image 50.

The reference graph 54 may be based on any number of different coordinate systems having known properties or coordinate positions. The known coordinate positions of the reference graph are used to encode data into the encoded image. In one embodiment for example, the reference graph 54 (FIG. 4) may include a series of whole or segmented adjacent shapes 56 positioned in reference to an origin or measuring point 58 of a coordinate system. The value to be encoded (FIG. 3) may be defined by the positioning of the shapes 52 in reference to the coordinate system 56.

In order to encode an image (such as in FIG. 3), an encoding process can be used. In one embodiment, a desired data value, such as a numeric value, may be encoded into an image by positioning adjacent or concentric shapes or lines 52 according to each digit within the value to be encoded. During encoding, the positioning of the shape or line 52 is determined by reference to or a comparison to a coordinate system of a reference graph 54. In one example, the numeric value to be encoded can be of any number of digits and can hold the value of 0 thru 9 in any of the digits. For example, a numeric value of X to be encoded can be characterized as having "n digits":
$X = x_n \ldots x_3 x_2 x_1$ where $x_1$ the least significant digit, $x_2$ is in the tens place, and soon, so that $$X = \text{sum}((x_1 * 10^{\wedge}0), (x_2 * 10^{\wedge}1), (x_1 * 10^{\wedge}2) \ldots (x_n * 10^{\wedge}(n-1))).$$

In this way, from a given numeric value to be encoded, a series of single digits can be defined.

Example 1

X=53564
Hence, n=5
$x_1=4$
$x_2=6$
$x_3=5$
$x_4=3$
$x_5=5$

In this example, the data to be encoded, X, has 5 digits, which means that n is equal to 5. For the numeric value 53564, the series of five single digit numbers is 5-3-5-6-4.

Example 2

X=273
Hence, n=3
$x_1=3$
$x_2=7$
$x_3=2$

In this example there are three digits, so n equals 3, and the series of digits is 2-7-3. Accordingly, the digits of 2-7-3 can be embedded/encoded into an image by the positioning of adjacent shapes.

A reference graph 54 (such as FIGS. 4-5) may be created that is based on a coordinate system such as polar coordinates. In other embodiments, a reference graph may be created based on other coordinate systems, such as rectangular coordinates (also know as x-y or Cartesian coordinates), two-dimensional coordinate systems, three-dimensional coordinate systems, cylindrical, spherical, or other coordinate systems.

In one example, a reference graph 54 may include whole or segments of concentric shapes 56, such as circles, hexagons, octagons, or any other planar figure or shape that can be centered about a center-point, origin or reference point 58. Each concentric shape or portion of a shape 56 may be equidistant from the next concentric shape, in one example.

Figure 4:
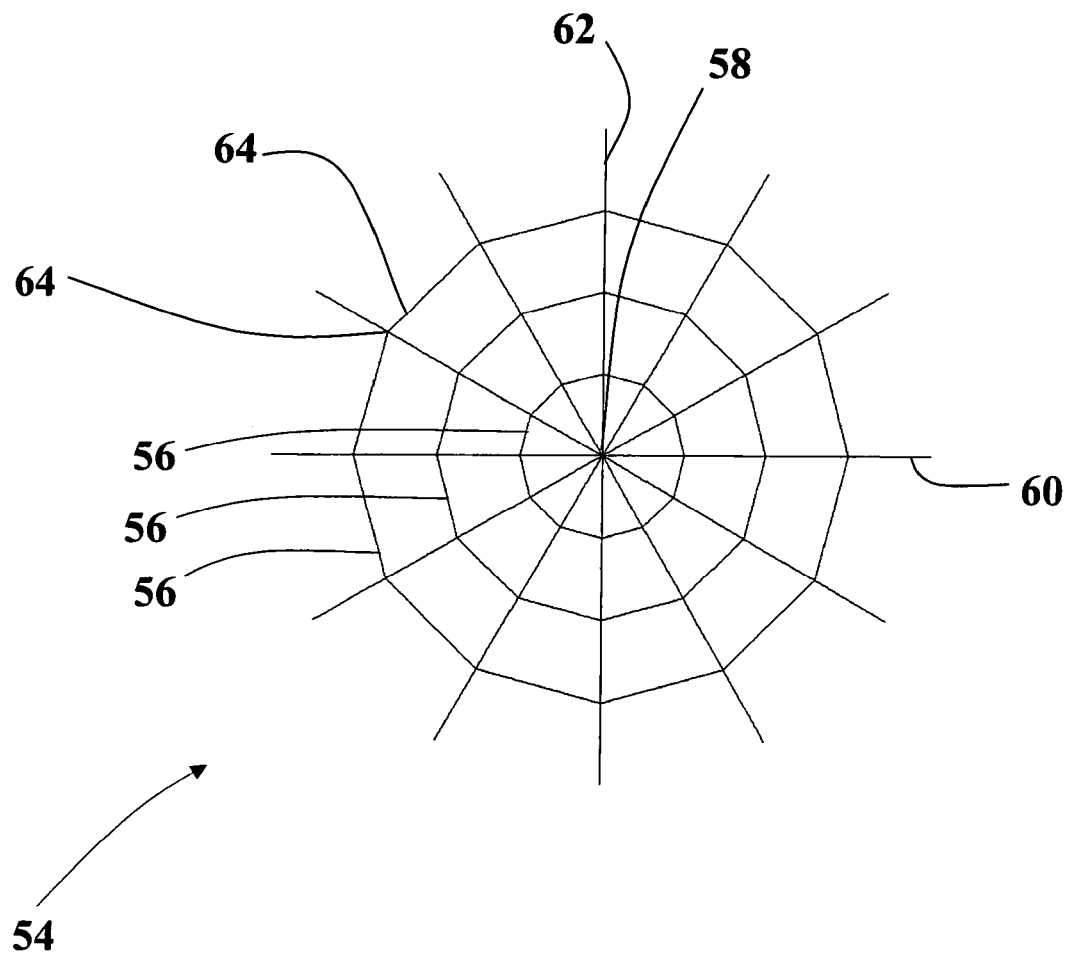
FIG. 4 is an example of reference graph having concentric shapes, according to one embodiment of the present invention.

An example of a reference graph 54 based on Cartesian coordinates is shown in FIG. 4. As shown, an x-axis 60 defines the 0° axis and the intersection between the x axis and y axis 62 defines the origin 58. In general, the reference graph comprises a series of geometric shapes or lines arrayed 56 or positioned at incremental radial distances from the origin. Simple geometric forms as well as more complex forms may be used. The example in FIG. 4 includes concentric 12-sided polygons or dodecagons 64; other examples may include concentric circles, concentric inverted arcs, or other shapes that are positioned about the origin. These examples illustrate only some of the shapes that can be used for the reference graph. Other examples could include, for example, any polygon with congruent sides and interior angles, and any other planar shape or line that has symmetry about the origin.

A reference graph 54 may include any number of concentric shapes, and the number of concentric shapes may be characterized as "m".

In one example, the number of digits (n) in the numeric value to be encoded into the image can be used in determining the number of concentric shapes (m) for the encoded image. Hence, in one example, m equals or is greater than n.

Figure 5:
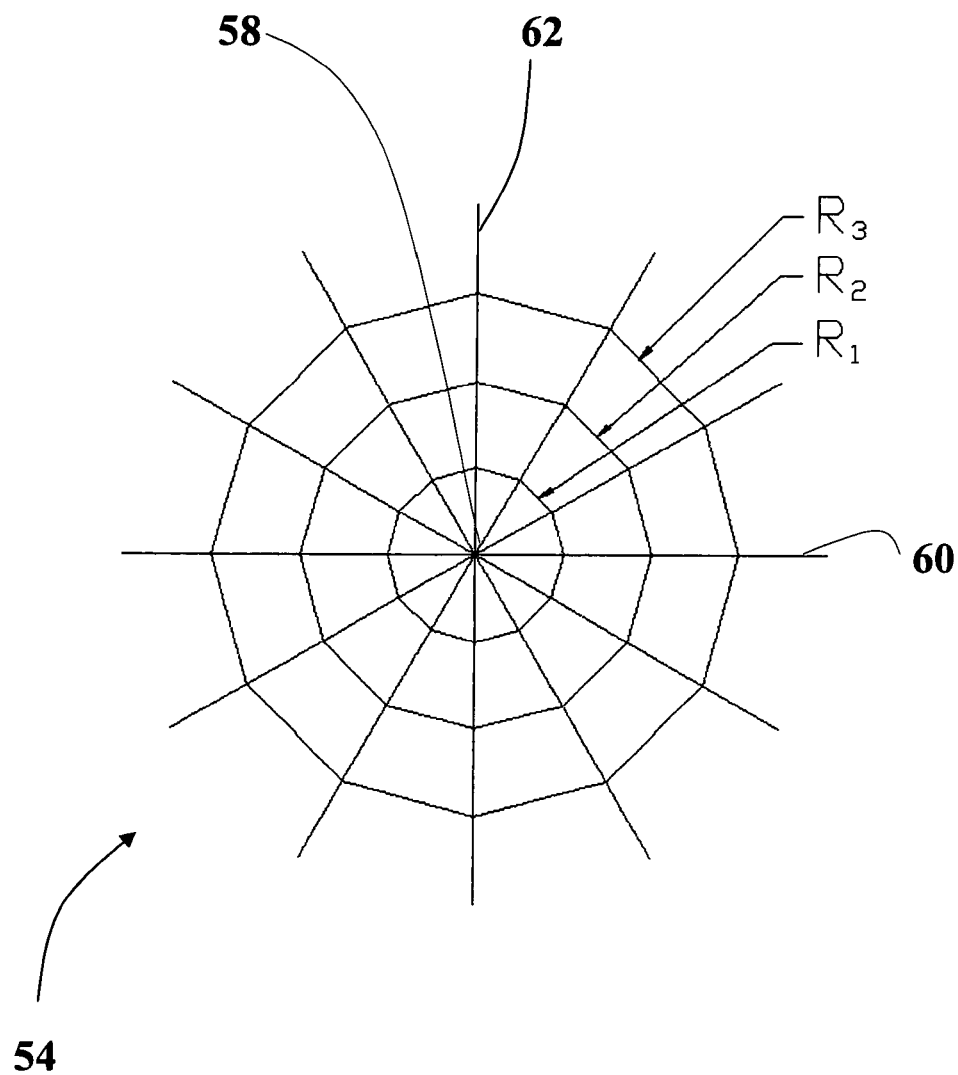
FIG. 5 is an example of the reference graph of FIG. 4 showing radial coordinates, according to one embodiment of the present invention.

For a given reference graph, each concentric shape can be represented by R1 thru Rn, where Rn relates to the radial distance from the origin. FIG. 5 shows how the example from FIG. 4 could be labeled. For the example of FIG. 5, m is equal to 3 because there are three concentric shapes in the example. This means the reference graph could be used to encode values having 3 digits or less, if desired. In order to encode a numeric value having more than 3 digits, additional concentric shapes could be added.

Figure 6:
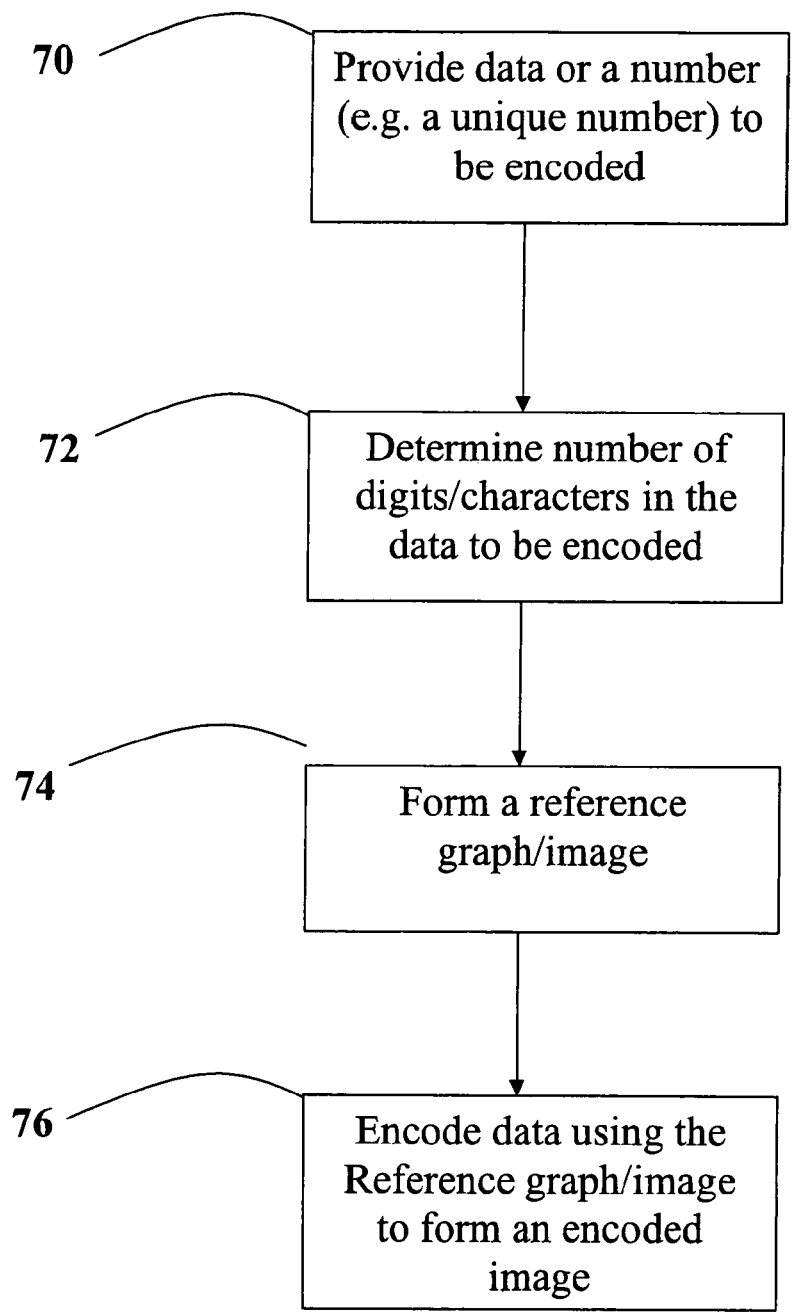
FIG. 6 is a flowchart depicting an example operations for encoding data to form an encoded image, according to one embodiment of the present invention.

FIG. 6 illustrates an example of operations for forming an encoded image, in accordance with one embodiment of the present invention. At operation 70, a unique number having a series of digits or characters to be encoded is obtained. The number to be encoded may be a unique number so that when the image is decoded, the value extracted from the decoded image corresponds to a unique value. However, in many applications it may be useful to utilize a non-unique number when forming the image. The number to be encoded may be expressed in a variety of forms, such as in base 10, as a digital number (base 2), as a hexadecimal code, or in any other numeric or alpha numeric manner.

At operation 72, the number of digits or characters in the number to be encoded are counted. For instance, if the value or data to be encoded is "273" then the number of digits in that data to be encoded is 3.

At operation 74, a reference graph or reference image is formed with concentric shapes, such as the reference graph illustrated in FIGS. 4-5. In one example, the reference graph/image has "m" concentric shapes, such as rings centered or positioned about an origin or central point, and the number of concentric shapes is equal to or greater than the number of digits in the value that is to be encoded (from operation 72).

Each concentric shape may be spaced apart, radially, from an adjacent concentric shape by a known distance. For instance, in one example of a reference image, each concentric shape is spaced apart from an adjacent concentric shape by a normalized value of one.

At operation 76, using the reference graph of operation 74, the value or data is encoded to form an encoded image. For instance, using the above example for the value "273", the number of digits for that value is three. Accordingly, the encoded image comprises three adjacent shapes, each shape having a radial coordinate value based on a digit of the value to be encoded.

Figure 7:
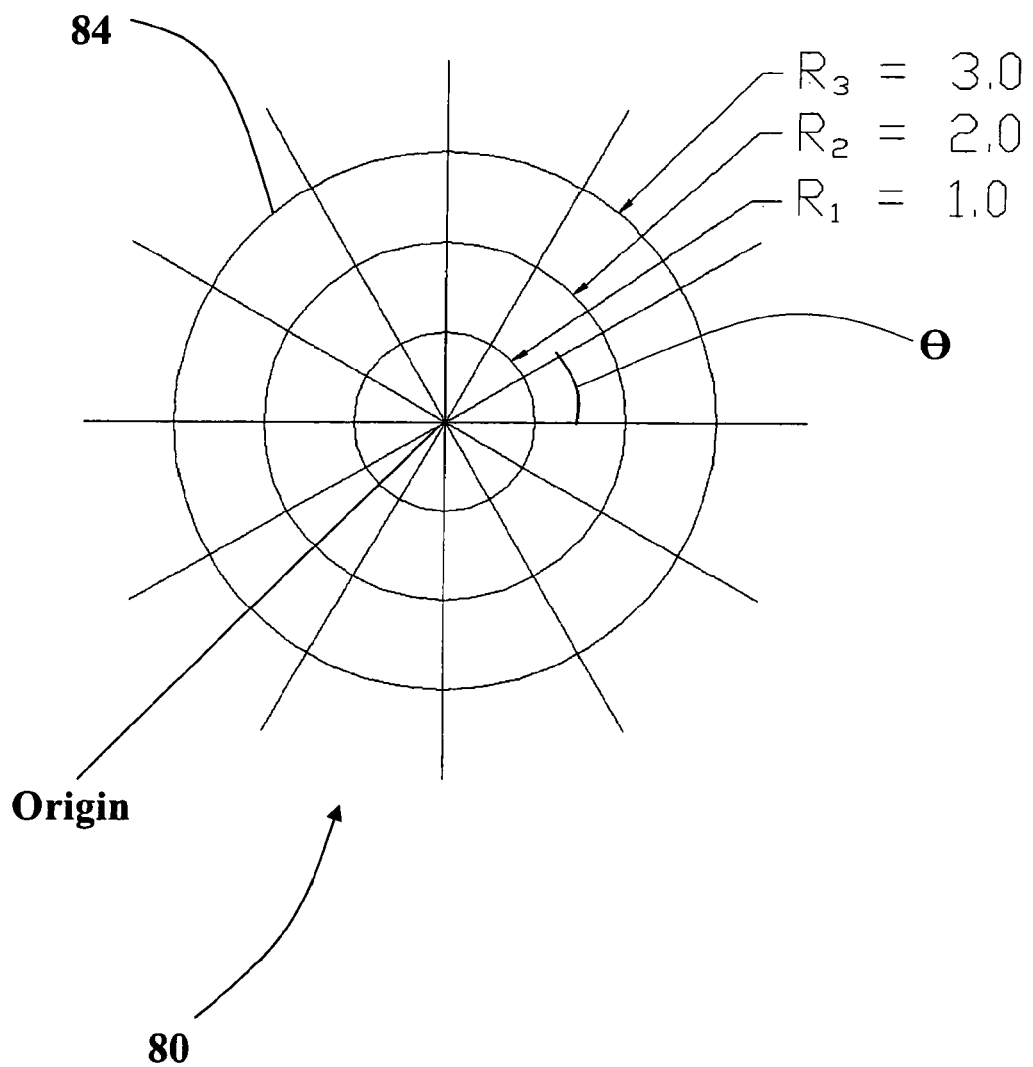
FIG. 7 is an example of a reference graph showing the radial coordinate values for the concentric circles according to one embodiment of the present invention.

An example of a reference graph 80 is shown in FIG. 7 having a plurality of circular concentric shapes.

Figure 8:
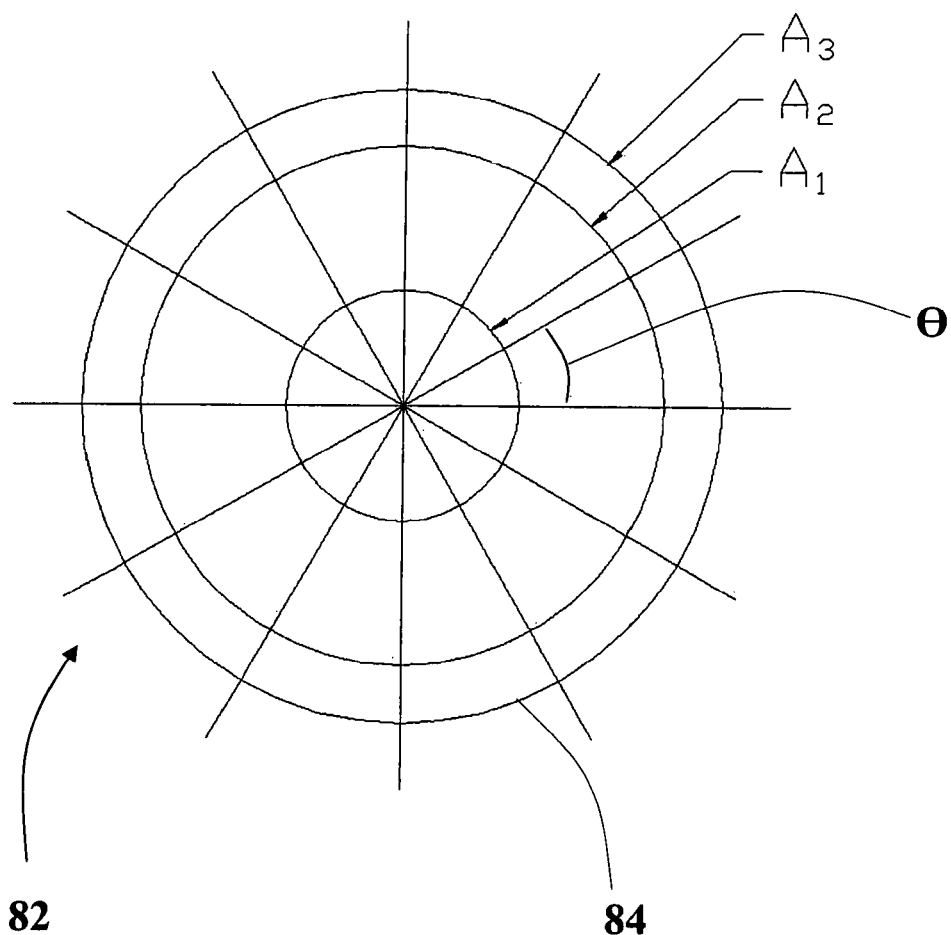
FIG. 8 is an example of an encoded image based on the reference graph in FIG. 7, according to one embodiment of the present invention.

Another example of an encoded image 82, formed by the method illustrated in FIG. 6, is shown in FIG. 8 which is encoded with the values of 273 when compared against a reference image 80 of FIG. 7 (in this example, the concentric shapes 84 are circles, although other concentric shapes may be used).

Mathematically, one example of the encoding process can be explained by the following:

A number, X, may be encoded into an image by creating an Encoded Graph, A, that is based on a given Reference Graph, R, using the following equation:

$$An=Rn+xn/10$$

where An and Rn are the radial coordinate values for the distance between the origin and the point at which the corresponding concentric shapes intersect the radial coordinate for the given theta.

Using the reference graph 80 shown in FIG. 7, (because of the circular concentric shapes 84, any angle theta can be used) and the numeric value of 273, the following mathematics can be applied:

Given: X=273
R1=1
R2=2
R3=3
n=3 (3 digits)
x1=3
x2=7
x3=2
Then:

$$An=Rn+xn/10$$

$$A1=1+3/10=1.3$$

$$A2=2+7/10=2.7$$

$$A3=3+2/10=3.2$$

For concentric shapes having radial distances that vary with a given angle theta, the reference graph may be scaled up or down to normalize for these variations. In other words, given reference graph may be scaled, normalized or otherwise adjusted so that at some angle theta, the distance between adjacent concentric shapes is equal to some known and measurable quantity, such as one. The units of this normalized dimension between concentric shapes will depend on the implementation, for instance, the distance could be 1 mm, 1 cm, 1 inch, or even some number that is not one—such as 0.75 cm, 1.25 mm, etc.

Figure 9:
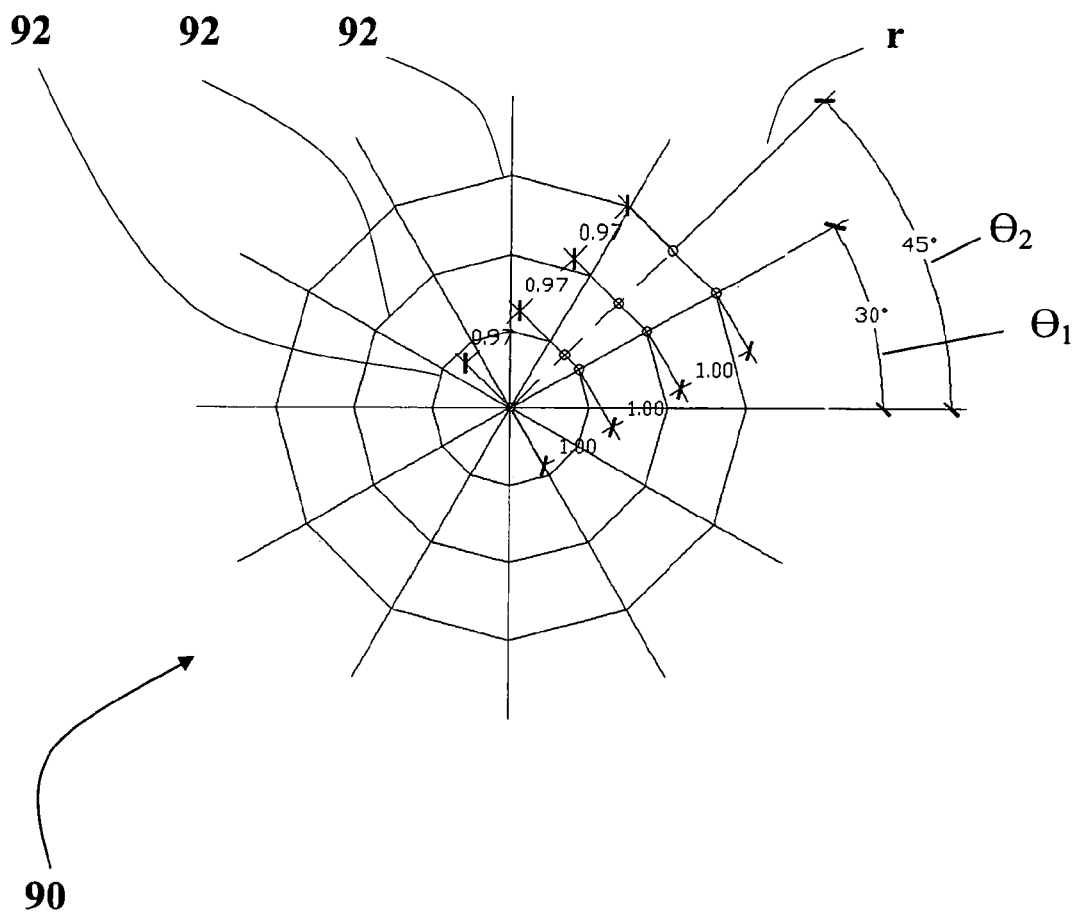
FIG. 9 is an example of a reference graph showing two sets of radial coordinates based on different angular coordinates theta according to one embodiment of the invention.
Figure 10:
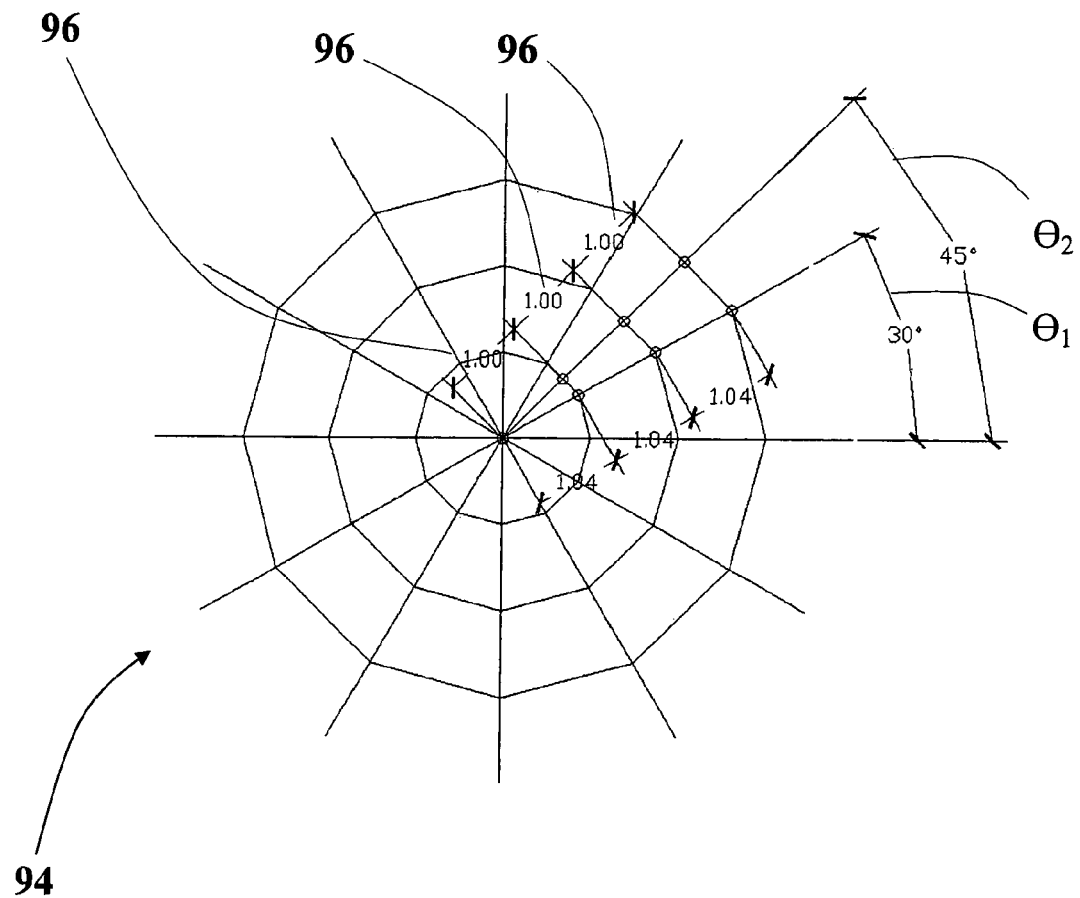
FIG. 10 is an example of a reference graph scaled off of the reference graph shown in FIG. 9 according to one embodiment of the invention.

FIG. 9 illustrates another example of a reference graph 90 comprising a series of concentric 12-sided polygons or dodecagons 92. As shown, the radial distance between concentric shapes for an angle theta of 30° is equal to one. However, due to the shape of the polygon, the radial distance for an angle theta of 45° is equal to 0.97. To account for this variation, the reference graph 90 shown in FIG. 9 may be scaled so that the distance "r" between each set of concentric shapes for theta equal to 45° equals one as shown in FIG. 10. FIG. 10 illustrates scaled radial differences 94 for concentric shapes 96 in a reference graph to account for the difference in radial distance at an angle theta of 30 and 45.

The encoded image may be scaled up or down in reference to the reference graph in order to encode a value based on the positioning of concentric shapes.

FIG. 3 illustrates an example of an encoded image 50 based on the reference graph 90 shown in FIG. 9, which is based on polar coordinates, and an encoded value of 273. Referring to FIG. 9, the radial distance for an angle theta of 30° is 1.0. Accordingly, at theta=30°, R1=1, R2=2 and R3=3. Each digit "xn" of the data to be encoded may be encoded by scaling, spacing or positioning a particular concentric shape in the encoded image 50 relative to a respective concentric shape in the reference graph 90. The following equation may be used where the scaling factor is 10:

$$An=Rn+xn/10$$

where An and Rn represent the distance between the origin or reference point and the point at which the corresponding concentric shapes intersect the radial coordinate for the given theta. This encoding technique may be utilized for each digit of the data or value to be encoded. For example, referring to FIG. 9, a reference graph 90 is provided with concentric shapes 92 that are evenly spaced so that the distance between adjacent concentric shapes is equal to 1.0 at an angle of theta of thirty degrees. A value 273 may be encoded (FIG. 3) according to the equation above by spacing the concentric shapes at a distance of 1.3, 2.7 and 3.2 respectively, for the first, second and third concentric shapes as illustrated in FIG. 3, where x1=3; x2=7; and x3=2.

Figure 11:
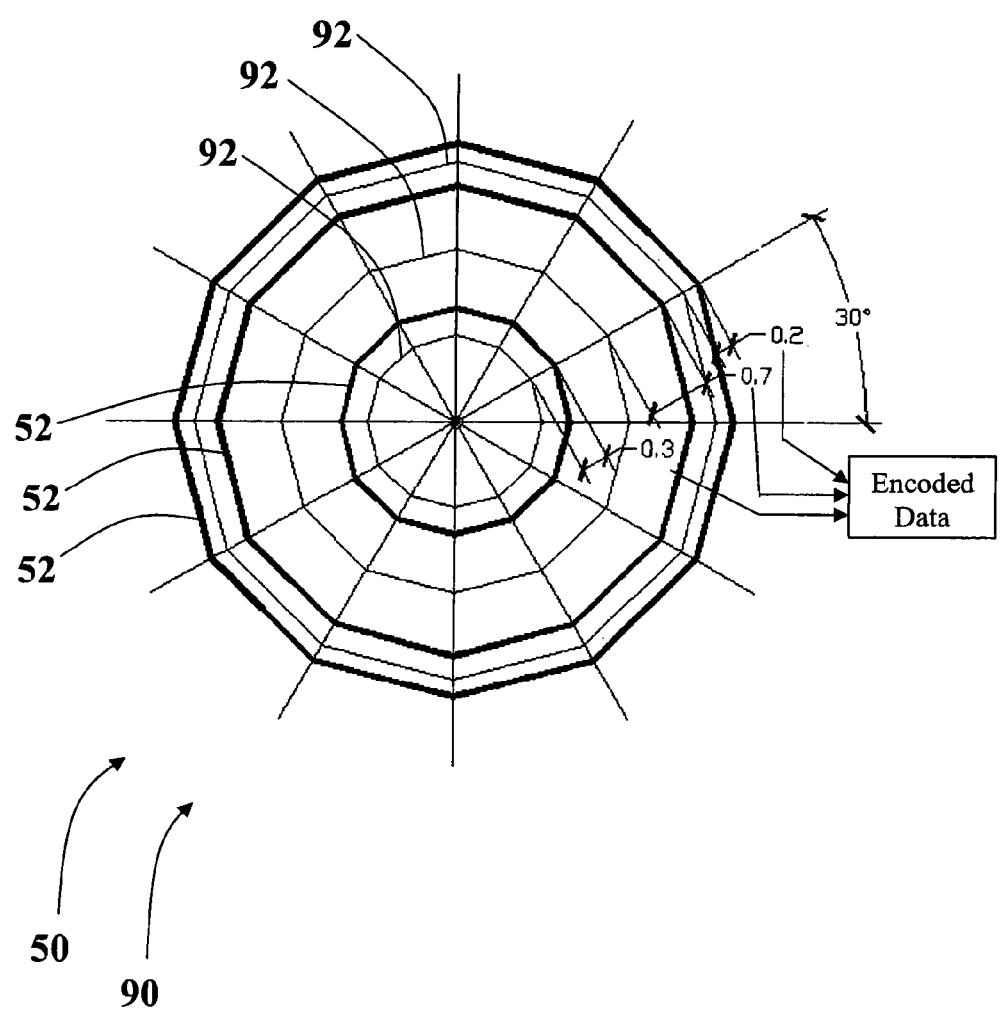
FIG. 11 is an example showing the encoded graph from FIG. 3 and the reference graph of FIG. 9 to illustrate calculation of the radial differences according to one embodiment of the invention.

FIG. 11 illustrates the reference graph 90 shown in FIG. 9 overlaid by the encoded image 50 of FIG. 3. Referring to FIG. 11, R1 is scaled upwardly so that the difference in distance between the two concentric shapes (reference concentric shape R1 and encoded image concentric—shape A1) along the axis of 30 degrees (theta) for the radial coordinate "r" is equal to x1 divided by 10, which for 273 is the single digit value "3" divided by 10, or 0.3 in this example. R2 is scaled up so that the difference in distance between the two concentric shapes (reference concentric shape R2 and encoded image concentric shape A2) along the given the axis of 30 degrees (theta) for the radial coordinate "r" is equal to x2 divided by 10, which for 273 is the single digit value "7" divided by 10, or 0.7 in this example. R3 is scaled up such that the difference between in distance between the two concentric shapes (reference concentric shape R1 and encoded image concentric shape A1) along the axis of 30 degrees (theta) for the radial coordinate "r" is equal to x3 divided by 10, which for 273 is the single digit value 2 divided by 10, or 0.2 in this example.

Figure 12A:
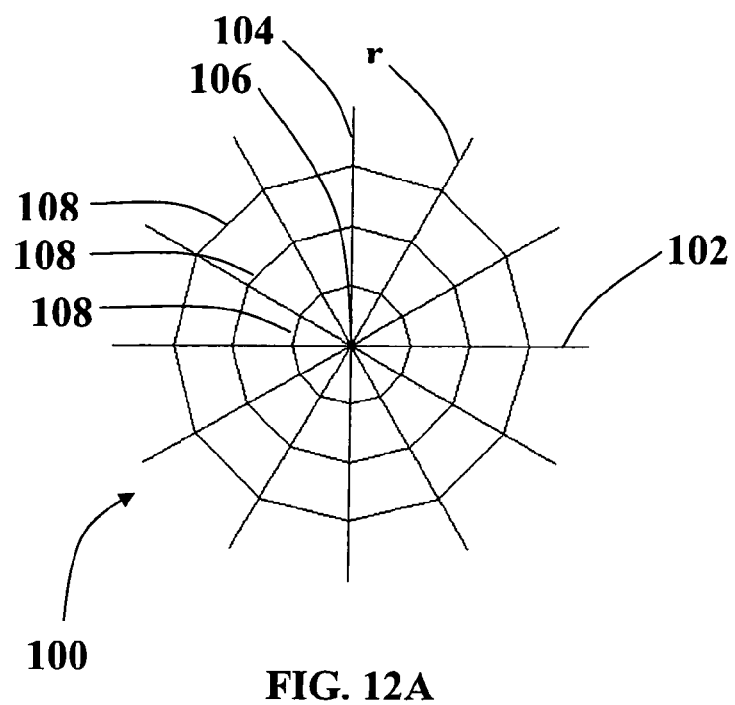
FIG. 12A is an example of a reference graph according to one embodiment of the invention.
Figure 12B:
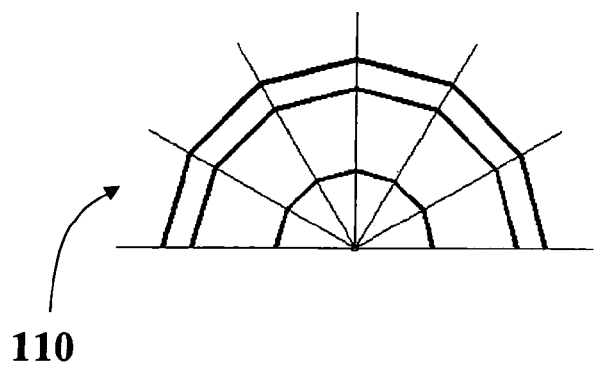
FIG. 12B is an example of a segment of an encoded graph based on the reference graph of FIG. 12A.
Figure 12C:
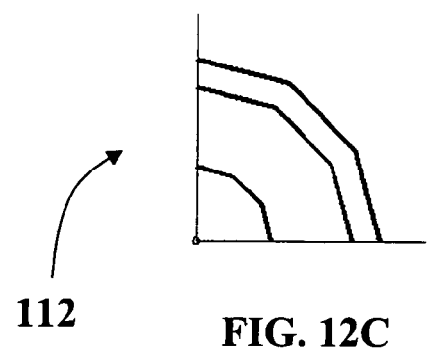
FIG. 12C is an example of a segment of the encoded graph shown in FIG. 12B based on the reference graph of FIG. 12A.

In another embodiment, a segment of or portion of a reference graph may be used to encode an encoded image. In another embodiment, a segment or portion of an encoded image may be used as an encoded image. FIG. 12A illustrates a 360° reference graph 100 based on Cartesian coordinates having an x-axis 102, y-axis 104 and center of origin 106. The reference graph 100 is used to form encoded segments illustrated in FIGS. 12B and 12C, respectively. For example, the radial distance "r" in the reference graph shown in FIG. 12A is known for each concentric shape 108 at an intersection for a given angle theta. That is, for an angle theta, the radial distance values for R1, R2 and R3 are known in the reference graph 100. FIGS. 12B-C show examples of encoded images 110,112 that could be used if desired.

As mentioned above, due to the dynamic nature of the encoding/decoding process, any number of different shapes may be used as the reference graph and consequently, the encoded image. FIGS. 13A-F illustrate some other examples, meant for illustrative purposes only and is not meant to be limited to the figures as shown herein. Referring to FIG. 13A there is shown an example of a reference graph 120 having a series of squares 122 positioned in relation to the origin. Applying a Cartesian coordinate system for example, each consecutive or concentric square 122 in the reference graph 120 of FIG. 13A has a known radial distance from the origin for a given angle theta. An example of an encoded image 124 is illustrated in FIG. 13B wherein the positioning of the concentric squares 126 can represent a value when compared to the reference graph 120 of FIG. 13A.

Similarly, FIG. 13C illustrates another example of a reference image 130 that is a variation of a dodecahedron. In this example, the dodecahedron will have varying radial distances depending on the angle theta, and the reference graph may be scaled up or down to normalize for these variations. An example of an encoded image 140 is illustrated in FIG. 13D, wherein the positions of the concentric shapes/lines 142 in the encoded image 140 may represent values of data.

An alternate configuration is presented in FIG. 13E. In this example, the angle theta is defined between the zero degree axis and the radial coordinate. The reference graph 150 may be scaled up or down to normalize for the nonlinear variation within the segment, if desired. FIG. 13E illustrates an example of a reference graph, and FIG. 13F illustrates an example of an encoded image 152, wherein the position of each shape or line can be representative of a digit or portion of a value encoded.

Hence, it can be seen that by providing a reference graph with known properties, a value having a plurality of digits or characters may be encoded into an encoded image that is based upon the value and a reference graph.

Figure 14:
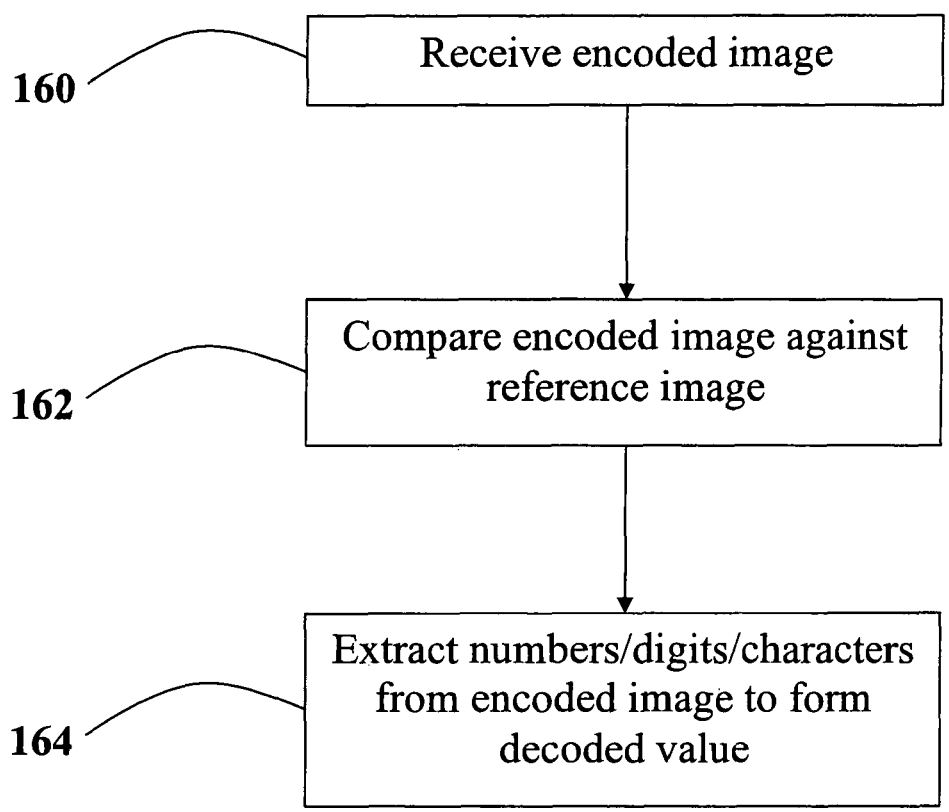
FIG. 14 is a flowchart depicting an example of a method of decoding an encoded image according to one embodiment of the invention.

The value encoded into the encoded image may be extracted to obtain data associated with the value. FIG. 14 illustrates an example of operations for decoding an encoded image, in accordance with one embodiment of the present invention. At operation 160, an encoded image is received and a reference graph or reference image is identified. The reference graph may be identified from the encoded image itself (i.e., by comparing the encoded image against images in a database using a closest match algorithm). At operation 162, the encoded image is compared against a reference graph or reference image and differences therebetween are determined. At operation 164, the values encoded in the received encoded image may be extracted on a digit by digit basis from the encoded image in order to form the decoded value or a precursor to the decoded value.

To decode an encoded image, such as shown in FIG. 8, the encoded image is compared against a respective reference graph/image and each digit or character of the encoded data may be extracted from the encoded image.

In one example, the radial distance of the first concentric shape in a received encoded image is compared against the radial distance of the first concentric shape in a reference graph, and the difference in radial distance between the concentric shapes is utilized to determine a value of a digit or character in the received encoded image. This process may be repeated for the other concentric shapes that are present in the received encoded image so that each of the digits/characters encoded in the received encoded image are extracted and the final data value may be determined.

FIGS. 7-8 may be used to illustrate an example decoding of an example of an encoded image. Referring to FIG. 8, for example, the encoded image 82 includes three concentric circles 84 positioned in reference to the origin having radial distance coordinates A1, A2, and A3 having radial distance values of 1.3, 2.7 and 3.2, respectively. Referring to FIG. 7, the example reference graph 80 has three concentric circles each having radial distance coordinates R1, R2 and R3 having radial distance values of 1, 2, and 3, respectively. Accordingly, using the equation:

$$(An-Rn)10=xn$$

for the first concentric circle as an example, the value of the last digit in the value to be decoded may be determined:

$$(1.3-1)10=3$$

The process is repeated for each digit in the value. In this way, each digit can easily be extracted to yield the value "273".

At least one reference graph may be selected so that comparison can be made during the decoding process. Because there can be an unlimited number of reference graphs created, the appropriate reference graph is selected to be used for the decoding process. The reference graph can be identified from the primary image (also referred to herein as the anchor image). For example, if an encoded image was used with an anchor image that was a spider web, this image could be matched to an image located in a reference image database. Anchor images may be stored in the database and be associated with a particular reference graph. Based on a match between the anchor image of an encoded image and an image in the database, the database may provide a respective reference image to be used for decoding the encoded image.

Numerous primary/anchor images could look very similar; however, some variables can be used to distinguish anchor images from others, such as the image's color, size, orientation, and/or any visibly distinguishable element.

In one example, a reference graph for use during decoding can be selected based on the same number and same form of concentric shapes as the encoded image. For instance, a database of reference graphs (and associated thetas and r values) can be stored, and an encoded image may be compared against the reference graphs stored in the database until the appropriate reference image is identified.

In some embodiments depending on the implementation, at least one theta angle may be selected to scale the reference graph and define the angular coordinate from which the radial differences between the reference graph and an encoded message will be measured.

The decoding process can also compare the reference graph(s) to the encoded image to measure the differences in distances at a given theta angle (i.e., the radial distance between the corresponding concentric shapes of the reference graph and the encoded graph for the given theta can be measured).

In one example, the encoding process can be reversed in order to serve as the decoding process to extract the numeric values from an encoded image. Once each of the distances are found between the encoded concentric shape and the corresponding reference shape, the distances can be manipulated to calculate the encoded values. For instance and in one example, the differences in distances can be multiplied by 10 to give a single digit number which will be part of the larger numeric value.

The single digit values, having been extracted from the encoded image, can now be combined to give the resulting numeric value or values if multiple reference graphs have been used in the decoding process.

Mathematically, one example of the decoding process can be explained by the following:

A number, X, is decoded from an Encoded Image, A, using a given Reference Graph, R, and the following equation:

For the given theta, r=An $$xn=(An-Rn)*10$$

Example

Using the reference graph 80 shown in FIG. 7 above, for any theta (since the concentric shapes are perfect circles), and using the encoded image 82 shown in FIG. 8, the following mathematics can be applied in one example:

Given:
Theta=any angle
R1=1
R2=2
R3=3
n=3 (3 digits)
A1=1.3
A2=2.7
A3=3.2
Then:

$$x1=(1.2-1)*10=2$$

$$x2=(2.7-2)*10=7$$

$$x3=(3.3-3)*10=3$$

X=273

Segments or portions of concentric shapes can be used as an encoded image, used as shown in FIG. 12A-C. Also, many other sets of the concentric shapes may be used, as shown in FIG. 13A-F.

Figure 15:
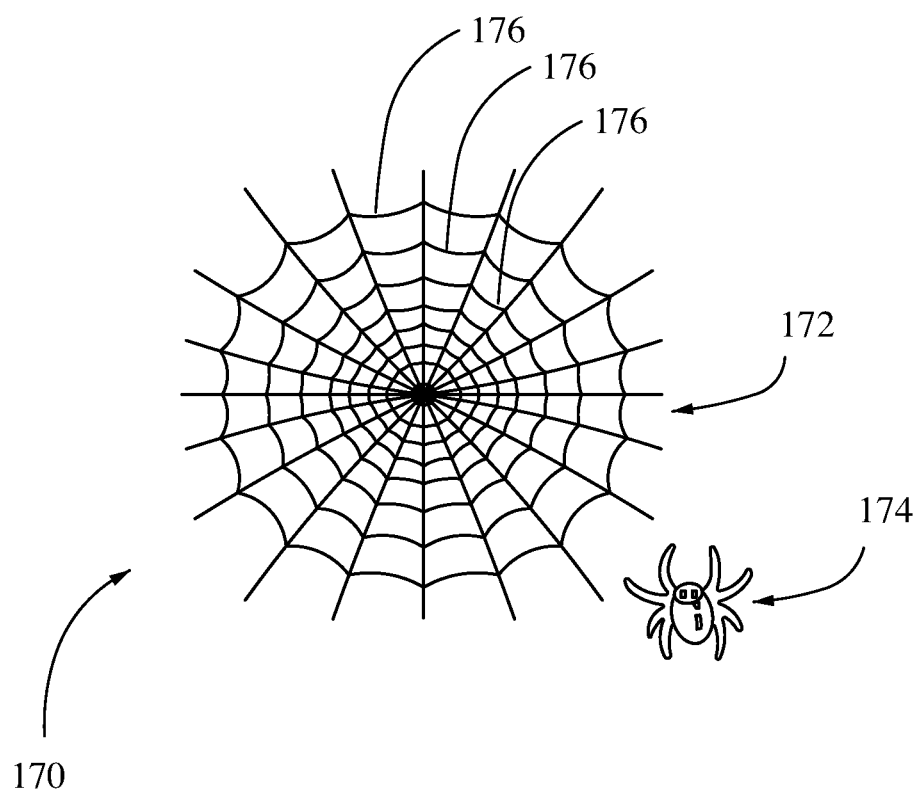
FIG. 15 is an example of an encoded image according to one embodiment of the invention.

FIG. 15 illustrates another embodiment of an encoded image 170 having an primary image 172 and a secondary image 174 positioned adjacent to the primary image 172 in this example. One or more secondary images may be used and the position of the secondary image 174 relative to the primary image 172 can be used to encode data in the encoded image 170, in a manner similar to FIGS. 1-2. In this example, the primary image 172 may also be encoded, for instance as described above through the use of concentric shapes. If desired, the color, size, shape, rotation or other characteristic of the primary image 172 or secondary image 174 may also be used to encode data.

In some embodiments, the secondary image 174 may be an image that conveys to the consumer that the encoded image on the print medium can be electronically linked via a mobile camera phone or similar wireless image capturing device, to the internet or other wireless communication network such as the cellular phone network. The primary image 172 itself may or may not be encoded depending on the implementation. For example, if the primary image is not encoded, then either the adjacent secondary image is encoded (i.e., via positioning of the secondary image) or there are other aspects or characteristics of the secondary image that are encoded.

The primary image 172 and the secondary adjacent image 174 may each be an identifiable mark, depending on the implementation. Further, the primary image and the secondary adjacent image can be individually encoded or in conjunction with one another are relatively encoded.

In FIG. 15, the primary image 172 has a series of concentric shapes 176 arrayed about its center in a manner similar to FIG. 3. In order to form the encoded image of FIG. 15, the primary image 172 could be encoded with a first value using one or more of the encoding operations previously described with reference to FIG. 3. Moreover, encoded image 170 could be encoded with a second value, using one or more or the operations described with reference to FIGS. 1-2. For instance, the second value could be encoded by, for instance but not limited to, positioning one or more secondary images 174 relative to the primary image, using a particular color of the secondary image, using a particular size of the secondary image, or rotating the secondary image. Hence, multiple values can be encoded to form an encoded image, wherein the multiple values are encoded using different encoding techniques.

It can be seen that embodiments of the present invention can be used to encode and decode data/numeric values into graphic images.

Linking Encoded Images to Databases/Marketing

In a further embodiment, an encoded image has data embedded therein and can serve as a link to content, promotions or other information accessed from an image capturing device, a mobile handheld device such as a mobile camera phone through the internet and/or through a wireless communication network. The encoded image, when placed on a print medium such as newspaper or magazine articles, advertisements, or corporate or product flyers, may function as a consumer tracking tool and information exchange between the consumer and the merchant or advertiser. The encoded image when placed in a personal identification medium such as a business card or shopping card or on personal property such as clothing or accessories, may serve as a consumer (user) initiated communication device to permit an individual or merchant or company to access the user's personal information such as a name or address, in exchange for an offer or to create electronic dialog.

In one embodiment, an encoded image may be electronically linked or referenced to a mobile marketing campaign database which is comprised of various functionalities.

A response logic module can include a set of steps or processes which permit specific content of the database to be returned or provided to the consumer or user in a variety of methods. Further, the response logic module may provide instant retrieval of the origination of the advertisement or promotion (and specifics to it) or any other content or promotional program, including message response types based on factors including time, frequency, message type, duration, sampling, or any other response means to enable simple to complex communication of information to the consumer or user.

The campaign database may include a collection of data or content such as text, presentation documents, audio, video, images, music or other files or electronic information in various appropriate digital formats or file types.

The campaign database may be web accessible by clients and individuals. For advertising clients, an interactive database interface can be provided to enable management of mobile communications and direct mobile marketing campaigns including message content, timing, frequency, scope, demographics, location, duration, games or promotions, and to analyze the results of mobile marketing campaigns or activities by tracing the number of times that particular encoded images are received and decoded.

For individuals, an interactive database interface can be provided to enable creation of a register and personal profile, and further may enable an individual to manage the message and content that is shared or communicated to others who capture/digitize the encoded image of the individual. For instance, an individual person could provide links to information such as a personal message, phone number, address, photo and/or other digital messages contained in the database. For individuals, the web accessible database can facilitate social networking communications and relationships through encoded image used by individuals. The individual determines to whom and what information is communicated, be it an another person or a company.

The campaign content database can, if desired, support layers of responses based on the integrity or quality of the image to be decoded. Due to variations in the quality of digital image capturing devices such as digital cameras functioning as data input devices, as well as environmental factors, photographs or digital images of captured (digitized) encoded images may contain noise, blur or low contrast or other factors that limit ability to accurately represent the data contained in the encoded image. In such cases, the campaign content database may seek to determine how much information is available and scale the response. This permits a range from low to high quality image to be decoded through progressive or layered encoding/decoding schemes.

Figure 16:
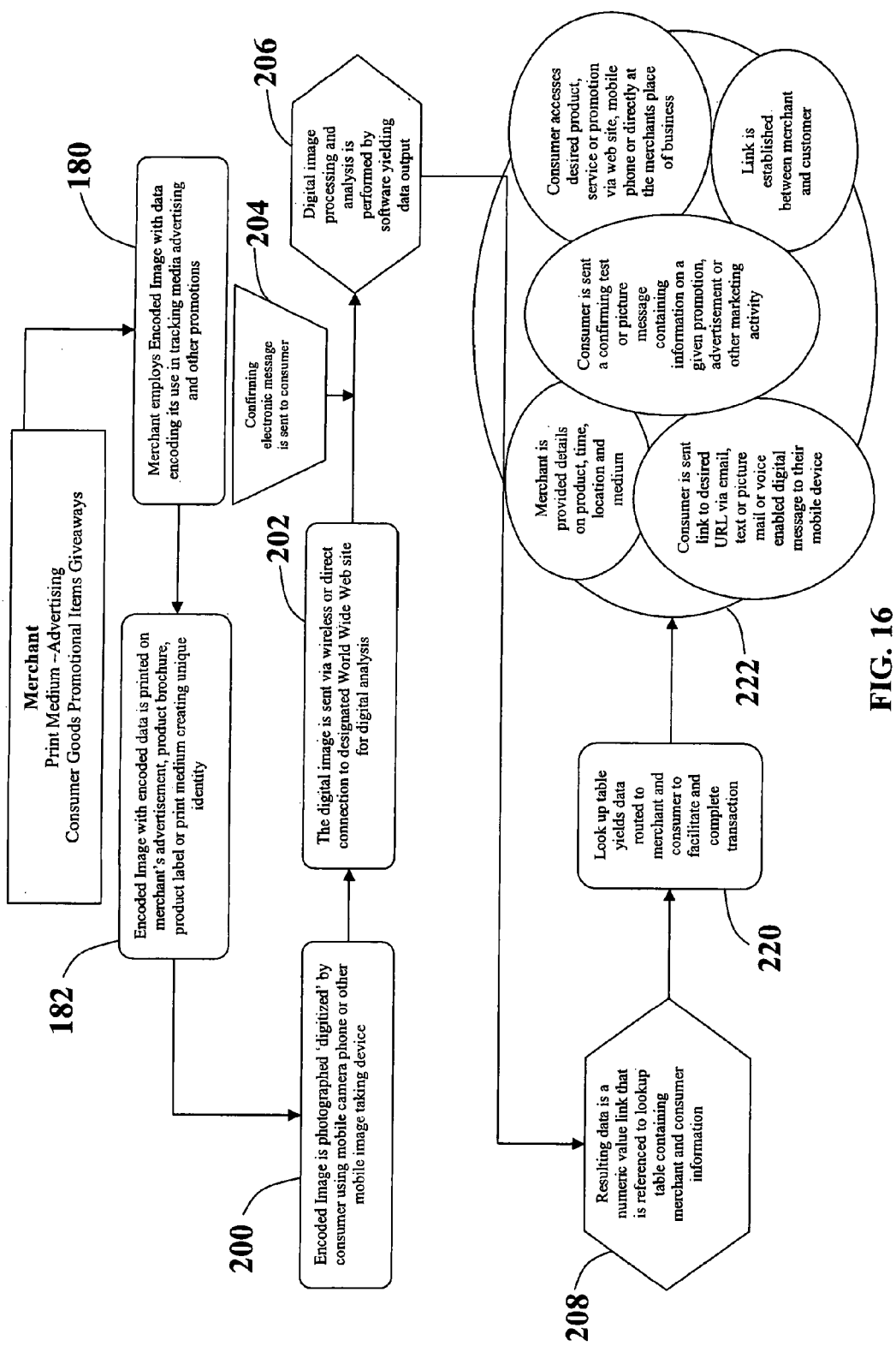
FIG. 16 is a flowchart depicting an example of a method for information exchange between merchants and consumer using an encoded image according to one embodiment of the invention.

Various embodiments for a process of using an encoded image having an identifiable mark for advertising and promotional purposes are described in FIG. 16. FIG. 16 relates to providing a real time link or connection between print medium and the internet and between merchants and consumers.

In FIG. 16 at operation 180, a merchant may obtain one or more encoded images (or groups of encoded images), for use in advertising or product promotions. In one example, the merchant selects an encoded image that the merchant can utilize for a line of products, or can use across all products that the merchant offers. Or the merchant can select multiple different encoded images that it will use with various products or promotions. In one example, the merchant may choose to use its logo encoded as the identifiable mark/anchor image of the encoded image.

At operation 182, an encoded image can be encoded with a data value in order to create a uniquely encoded image. In one example, a single encoded image encoded with a particular data value can be used by an advertiser/merchant in an advertisement that is distributed such as in a magazine, newspaper, product label or other print or electronic media. By using a particularly encoded image with a particular advertisement, the merchant or advertiser can track consumer responses to that advertisement.

In one embodiment, the advertiser/merchant may purchase or acquire the encoded images from a company that provides such encoded images and manages/tracks the use of such marks.

In another example, a family onset of encoded images is created. This can be done, for instance, by encoding a single encoded image with various different data values to create a plurality of encoded images having similar appearance but each having different encoded values. Each uniquely encoded image can then be used in a different manner (i.e., in different advertising or marketing channels). The fact that each encoded image has a similar appearance (but may have different encodings) permits the advertiser/merchant to use the set of encoded image in a manner akin to a trademark—a consumer may associate the appearance of the encoded image with a source (merchant, vendor, company, etc) of a product or service.

For instance, assume that a single encoded image is encoded with three different numeric values to form three unique encoded images that are all similar in appearance. The first uniquely encoded image can be used by a company/advertiser, for instance, in a particular magazine advertisement. The second uniquely encoded image can be used by the company/advertiser, for instance, in a national newspaper advertisement. The third uniquely encoded image can be used by the company/advertiser, for instance, in an on-line internet coupon promotion/advertisement. Because each of the three encoded images has the same overall appearance, a consumer may associate the three encoded images with the company/advertiser, but because the three encoded images have different values encoded therein, the company can use the encoded data (during a decoding process) to track the promotion associated with the encoded image, or determine which advertising channels were more effective, or for any other purpose.

Figure 17:
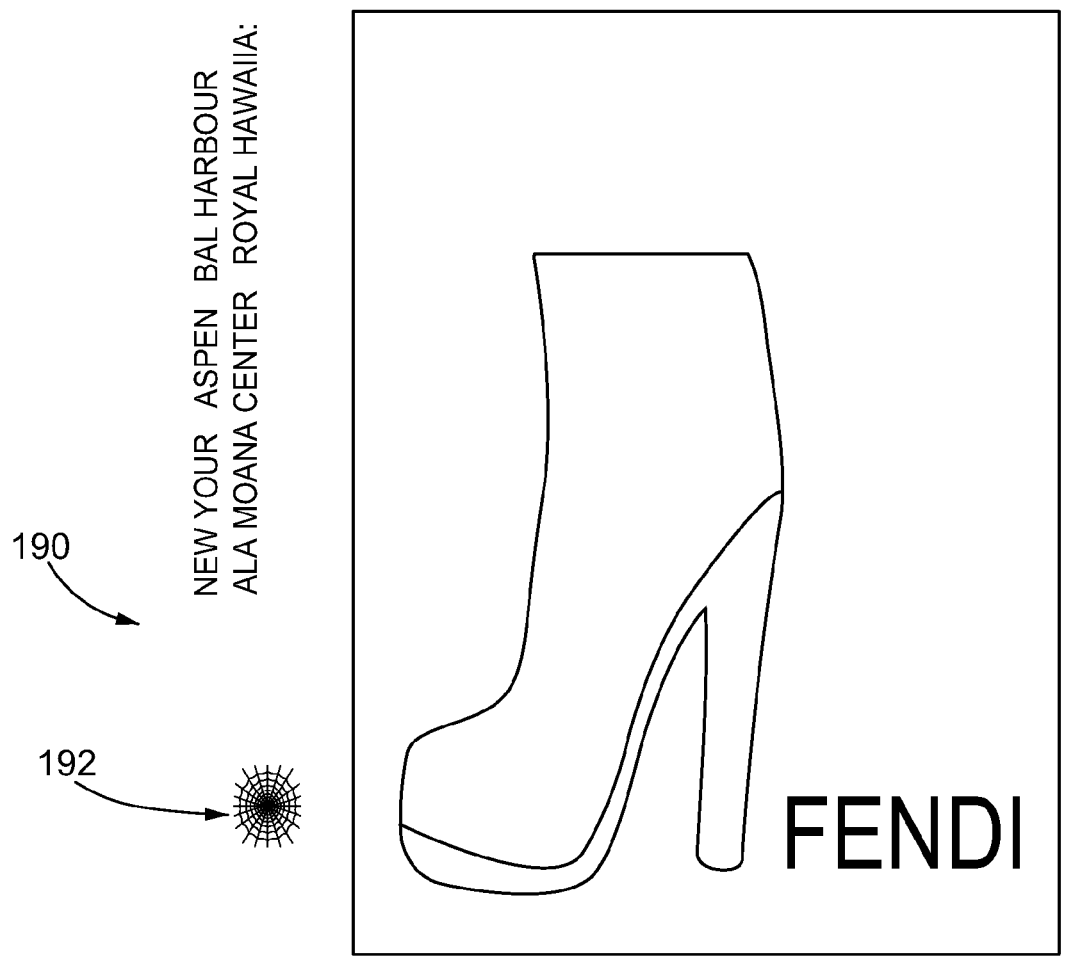
FIG. 17 is an example of an advertisement showing an encoded image according to one embodiment of the invention.

For instance, FIG. 17 shows a FENDI™ boot advertisement 190 that has an encoded image 192 therein in accordance with one embodiment of the present invention. The encoded image 192 may be included as a visible part of the promotional material, visible to the consumer as shown in FIG. 17. In one embodiment, for example, the encoded image 192 may comprise an identity image such as the FENDI™ logo, in association with an adjacent secondary image which functions to encode data, as discussed above for FIG. 1.

The encoded images can help provide information to the merchant relating to the specific advertisement, the geographical region the print medium was shipped to, the magazine or print medium which the promotion/advertisement is placed, the location in the medium and the date in which the advertisement was published and the date of the captured interest. In one example, an encoded image and its numerical value are unique to specific purpose of the advertiser. The encoded image can be as general or specific as the merchant desires. For example, in FIG. 17, the encoded image 192 could include FENDI's general trademark for all print mediums that simply links consumers to their web site, or the encoded image could include data related to an exact advertisement in a specific volume or issue of a specific magazine.

An encoded image can be placed onto a multiple print mediums, such as a product label, printed advertisement, and/or product brochure or other promotion vehicles. Encoded images may also be incorporated into apparel and accessories by various means and methods including but not limited to silk screen, embroidery or other methods so as to create a linking mechanism between people.

At operation 200 of FIG. 16, the encoded image is captured digitally, preferably by a mobile camera phone, by the consumer.

At operation 202, once the consumer captures (photographs) the encoded image referencing the merchant's product or service, the captured image (having the encoded image therein) is sent electronically by the consumer via a wireless or direct connection to a designated address or destination for posting and analysis, in one example, to provide real time response to advertisers' promotional programs.

Once a consumer has digitized the encoded image via a mobile camera and sent it via electronic methods to a given address, World Wide Web site (URL), or a phone number, it becomes a validated sales lead. The encoded image is then decoded (operation 206). Concurrently, if desired, a confirming electronic message may be sent back to the consumer to confirm receipt of the encoded image (operation 204).

Embodiments of the present invention may provide the customer a means of expressing interest in particular products/services and communicating wireless and in real time his/her interest in said product/service. The communication initiated by the customer creates for the advertiser an opportunity for targeted marketing with the customer. In one example, for the customer having sent the mark to the designated address or location, it creates an opportunity to opt into products or services of which they have an interest.

In one example, an internet site to which a consumer is linked can act as a convenient tool for consumers to interact with merchants of their choosing. The site may offer personalized services to support the consumer's shopping interests including promotional offers and a library of captured marks in one implementation.

At operation 206, the digitized image of the encoded image, after having been sent electronically to the given electronic address, is read for image analysis. The data embedded in encoded image is extracted and read, for instance, by digital image analysis software. In one example, the process of analyzing the encoded image and reading its contents may include scanning individual pixels of the encoded image, and thereafter recording and mapping the scanned results. Using decoding processes as described herein, a numeric value can be extracted from the encoded image and the numeric value can be used to form a unique data link. Characteristics of the encoded image and its pixels can be examined, including pixel color, hue, shade, size, density, relative and specific placement of individual pixels and their characteristics relative to a reference image/graph and other inherent characteristics. In one implementation, the camera phone may provide some or all of the decoding communication and analysis either independent of or in conjunction with a remote server.

In one example, the encoded data is linked or referenced to a mobile marketing campaign database and response logic completing the merchant to consumer connection. A look up table contained within the database may include a collection of data (i.e., created when the merchant employs an embodiment of the invention) to provide retrieval of the origination of the advertisement or promotion and specifics to it or any other content or promotional program including message response types based on factors including time, frequency, message type, duration, sampling, or any other response means to enable simple to complex communication of information to the consumer.

At operation 208, the encoded image and its encoded data are decoded into numeric value that can be referenced to a look up table for the purposes of tracking consumer interest and behavior. An example of a lookup table is shown in FIG. 18. In one example, the lookup table may map a received data value to a company, a product, a promotion, a print medium, a vendor, publication date, a URL, or one or more actions. For example, a numeric value decoded at operation 208 could reference FENDI™ in the lookup table. In addition, the table notes that the encoded image was used on a promotion for a new product in a magazine ad for Allure magazine and may provide a link to the new product information in the form of a URL, which could be automatically loaded into the user's cell phone and the user's browser could be automatically directed to that URL.

A tracking table 210 may also be provided as shown in FIG. 19. In one example, a tracking table may log a received data value, and also log the total number of hits for this encoded value as well as other statistics such as hits per week, etc. This example shows different ways of using the mark to track and analyze a merchants advertising or promotional campaign. The example of FIG. 17 (the FENDI™ advertisement) is in the top row of the lookup table of FIG. 18 and in the top row of the tracking table of FIG. 19. By using the data in the table of FIG. 19, the merchant can track how many hits of the encoded image are sent to the site for this specific ad in a particular volume of a magazine, in one example. By tracking the date the encoded image was first used in an ad, a merchant can also track the active life span of the advertisement, the date range of its activity and its lasting effectiveness.

By the use of embodiments of the invention, a merchant using advertising, or other promotional mediums to promote and sell its products and services can improve its marketing effectiveness with databases of information (such as lookup tables and tracking tables) provided as a result of the creation of the link between the merchant's print marketing programs. In one example, the encoded image is small in proportion to the print medium, making it big enough to be recognized by a consumer, yet small enough so it does not distract from the advertiser's message.

As recognized by the present inventors, other coding methods or symbologies such as bar codes may be viewed as undesirable in certain print mediums whether they are an advertisement, a corporate or product brochure or other promotional medium. In contrast, an encoded image in accordance with embodiments of the present invention can provide the merchant with a recognizable linking tool that does not adversely affect the design of a marketing message or the overall promotional presentation being communicated.

In one example, the encoded image can include a logo or symbol of a company that signifies to the consumer that the print medium is electronically active and readable with a wireless digital images taking device through wireless communication protocols. In this way, the encoded image can become a standard, widely recognizable icon that consumers can recognize will activate a link to a merchant. The encoded image can symbolize a link to the web and communicates to the customer that the printed encoded image is in fact encoded and can be captured through the use of a mobile device and sent to a web site for decoding, analysis and follow on response from the advertiser or other interested party.

In accordance with one embodiment of the invention, use of an encoded image on printed media will make it possible for companies to assess the effectiveness of their marketing programs by receiving exact feedback on advertising and promotional plans via hits to a website or other electronic communication methods and counts. Further, merchants will be able to improve upon their marketing investment by knowing precisely which advertisement/promotions are yielding results.

At operation 220 in FIG. 16, information may be sent to the consumer and another set of information may be sent to the merchant. For the consumer, a URL web link or other electronic message such as a text, video, audio or picture message that may contain a name, a number, or an alphanumeric string or other data or information is sent to a predetermined web site and/or directly back to the consumer's wireless device. If the encoded image for promotional use, consumer's can be automatically entered in contests, added to mailing lists, be sent a code to be used as a coupon, or provided with other information or promotions.

In one embodiment, the merchant is sent or has access to specific information 210 regarding the hits made by consumers using the encoded image. The information can be amassed on a specific web site for instant real time analysis or it can be sent to another web site or email address.

At operation 222, a number of different communications can be initiated between customer and merchant. The look up table 230 can be used to provide a URL or other electronic message such as a SMS text or picture message that is either sent directly back to the consumer's web-enabled mobile device or is saved as a link in a webpage for the customer to reference at later time; the lookup table may provide for automatic promotion entry or mailing list sign-up.

Embodiments of the present invention may be used for consumer driven or consumer "opt in" mobile marketing campaigns, where the target user is the consumer (or individuals in the case of person to person communications).

Social Networking

Figure 20:
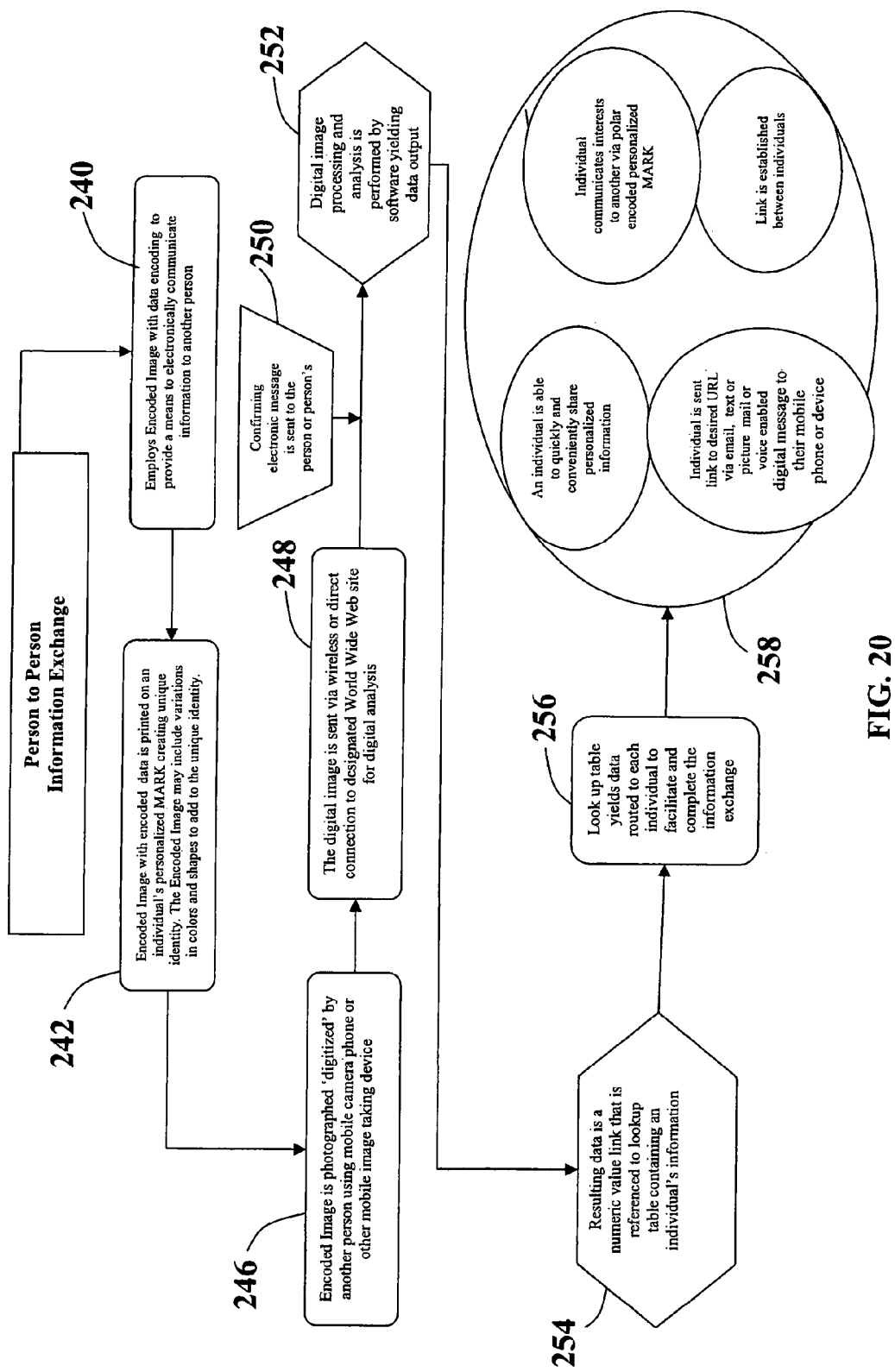
FIG. 20 is a flowchart depicting an example of a method for person to person information exchange using an encoded image according to one embodiment of the invention.

In another embodiment, encoded images may be used for a person to person communication tool in a social networking or business networking environment. This process can be used to link individuals to one another, as shown in FIG. 20. People or users may register to have their own unique identifiable mark or logo be encoded to create encoded images that are consumer friendly, highly flexible, encoded images that can be captured by friends, family, acquaintances, business colleagues, or any other individual seeking more information about that person wishing to socially interact. An encoded image can act as a method for individuals to communicate to others their individual interests or hobbies. An encoded image or parts of the encoded image can be color enhanced, or can include of every day icons such as astrological sign or the face of a person. This enables an encoded image to reflect the personality of the individual.

An encoded image can be placed onto a multitude of mediums, such as a label, printed document, a sticker or patch or any other item or personal property. An encoded image may also be incorporated into apparel and personal accessories by various means and methods including but not limited to silk screen, embroidery or other methods so as to create a linking mechanism between people. An encoded image can function as a person to person communication tool to share information between two or more parties.

FIG. 20 illustrates a process that can be used for person to person communications, for instance with the encoded image affixed to a person or a person's property for social networking.

People may register to have or obtain their own unique encoded images that can be captured by friends, family, acquaintances, business colleagues, or any other individual seeking more information about that person and wishing to socially interact or to communicate individual interests or hobbies. Encoded images can be color enhanced to further signify areas of interest or to offer greater personalization.

Information that can be contained in a person to person database for social networking could include contact information including name, address, phone number(s), email address, hobbies, other personal information and various web links that an individual may use, such as personal and business websites. A person might carry around their personalized encoded image as a symbol imprinted on something they carry with them, or they could have the encoded image placed on printed materials such as business cards, stickers, or other materials to give to other persons. A person may have multiple personalized encoded images to communicate a variety of different information based on their desires.

In FIG. 20 at operation 240, a person may use an encoded image with data encoding to provide a means to electronically communicate with another person. In one example, an encoded image may be an astrological sign, favorite sports team, favorite band, or any identifiable mark or symbol that connotes information that the person would like to convey. In one example, the person may choose any logo encoded as the encoded image.

At operation 242, the encoded image may be printed on an individual's personalized mark creating a unique identity. In one example, the encoded image is printed on an individual's business card.

At operation 246, the encoded image is photographed or digitized by another person using a digital image capturing device such as a mobile camera phone. The digital image is sent via wireless or direct connection to a designated world wide web address for digital analysis in operation 248, with an electronic confirmation message (optional) at operation 250. Digital image processing and analysis is performed, yielding data output at operation 252. A numeric value is extracted from the encoded image and referenced to a lookup table containing an individual's information at operation 254.

The look up table (230 in FIG. 18) yields data that may be routed to the recipient's mobile phone to facilitate and complete the information exchange in step 256. The information returned may be in the form of a link to a desired URL via email, text or picture mail, or voice enabled digital message to their mobile phone or device. In another embodiment, a person having an encoded image may associate desired personal information with the encoded value in the lookup table. In another embodiment, a person could have a plurality of different encoded images, each for different purposes, for example, one encoded image associated with data for business purposes, and another encoded image for social purposes (258).

In various embodiments, the encoded image could be dynamic. For example, a person could affix a personalized encoded image to a greeting card and specialize the text associated with the encoded image for a particular purpose through the data look up table. In another embodiment, the data presented in the lookup table may be continually updated, such that a user who digitizes/captures the encoded image would receive updated personalized information in return. In this way, an individual having an encoded image is able to quickly and conveniently share personalized information with one or more people.

Encoded images can be read with existing technology, such as in digital cameras or scanners, modified to have the basic decoding operations described herein. Because the decoding methods may use a reference graph or reference image, tolerances can be measured and controlled based on the level of technology of the scanner or digital camera. As digital cameras and scanners get to higher and higher resolutions, the number of digits that can be encoded in an image may grow.

Use of embodiments of the present invention can be expandable as digital image analysis techniques and mobile camera phone image quality advances. As mobile camera phone digital cameras achieve higher resolutions, camera lenses improve, auto-focus becomes widely available as well as other camera imaging improvements, the amount of information or digits that can be encoded in an encoded image will increase.

The encoded images may be formed using other images that incorporate the features as disclosed herein and may also be formed such as disclosed in U.S. Provisional Application Ser. No. 60/862,208 entitled "Encoding and Decoding Data into an Image Using Identifiable Marks and Encoded Elements," filed on Oct. 19, 2006, the disclosure of which is hereby incorporated by reference herein in its entirety.

While embodiments of the present invention have been described and shown with encoded images having one primary image, it is understood that encoded images could be formed with multiple primary images if desired. One or more secondary images could also be used to form an encoded image.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

Embodiments of the invention can be embodied in a computer program product. It will be understood that a computer program product including features of the present invention may be created in a computer usable medium (such as a CD-ROM or other medium) having computer readable code embodied therein. The computer usable medium preferably contains a number of computer readable program code devices configured to cause a computer to affect the various functions required to carry out the invention, as herein described.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

While the invention has been particularly shown and described with reference to embodiments thereof, it will be understood by those skilled in the art that various other changes in the form and details may be made without departing from the spirit and scope of the invention.

We claim:

1. A method of linking an encoded image with a campaign database stored on a non-transitory, tangible computer-readable storage medium, comprising:
   providing the encoded image to a computing device, the encoded image being associated with at least one characteristic provided by a user of the computing device;
   referencing the at least one characteristic to the campaign database that includes a collection of data;
   providing, through the campaign database, at least one response, wherein the at least one response is determined based on the at least one characteristic; and
   delivering, to the computing device, one or more specific responses selected from the at least one response.

2. The method of linking an encoded image with a campaign database of claim 1 wherein the user characteristic includes message frequency.

3. The method of linking an encoded image with a campaign database of claim 1 wherein the user characteristic includes message content.

4. The method of linking an encoded image with a campaign database of claim 1 wherein the user characteristic includes message timing.

5. The method of linking an encoded image with a campaign database of claim 1 wherein the user characteristic includes message scope.

6. The method of linking an encoded image with a campaign database of claim 1 wherein the user characteristic includes message demographics.

7. The method of linking an encoded image with a campaign database of claim 1 wherein the user characteristic includes message location.

8. A system for marketing and communication comprising:
   a printed medium having an encoded image printed thereon, the encoded image including an associated user characteristic,
   a campaign database referenced to at least a portion of the user characteristic, wherein the user characteristic enables communication with the campaign database, the system performing a method of,
   referencing the user characteristic to the campaign database;
   providing, through the campaign database, at least one response, wherein the at least one response is determined based on the user characteristic; and
   delivering, to the user, the at least one response.

9. The system for marketing and communication of claim 8 wherein the user characteristic includes message frequency.

10. The system for marketing and communication of claim 8 wherein the user characteristic includes message content.

11. The system for marketing and communication of claim 8 wherein the user characteristic includes message timing.

12. The system for marketing and communication of claim 8 wherein the user characteristic includes message scope.

13. The system for marketing and communication of claim 8 wherein the user characteristic includes message demographics.

14. The system for marketing and communication of claim 8 wherein the user characteristic includes message location.

15. A campaign marketing system for linking an encoded image accessed by a user with a database of information, comprising:
   a campaign database that operates to,
   receive a characteristic from the image accessed by the user;
   referencing the characteristic to the campaign database;
   providing, through the campaign database, a response determined based on the characteristic; and
   delivering the response to the user.

16. The campaign marketing system of claim 15 wherein the characteristic from the image includes message frequency.

17. The campaign marketing system of claim 15 wherein the characteristic from the image includes message content.

18. The campaign marketing system of claim 15 wherein the characteristic from the image includes message timing.

19. The campaign marketing system of claim 15 wherein the characteristic from the image includes message scope.

20. The campaign marketing system of claim 15 wherein the characteristic from the image includes message demographics.

21. The campaign marketing system of claim 15 wherein the characteristic from the image includes message location.

* * * * *